United States Patent
Bartolome Rodrigo et al.

(10) Patent No.: US 12,003,369 B2
(45) Date of Patent: Jun. 4, 2024

(54) REDIRECT SERVER IN A WIRELESS COMMUNICATION NETWORK

(71) Applicant: Telefonaktiebolaget LM Ericsson (publ), Stockholm (SE)

(72) Inventors: Maria Cruz Bartolome Rodrigo, Madrid (ES); Attila Mihály, Dunakeszi (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 6 days.

(21) Appl. No.: 17/605,446

(22) PCT Filed: Mar. 31, 2020

(86) PCT No.: PCT/EP2020/059062
§ 371 (c)(1),
(2) Date: Oct. 21, 2021

(87) PCT Pub. No.: WO2020/221535
PCT Pub. Date: Nov. 5, 2020

(65) Prior Publication Data
US 2022/0200847 A1 Jun. 23, 2022

(30) Foreign Application Priority Data
Apr. 30, 2019 (EP) .................................... 19382323

(51) Int. Cl.
*H04L 41/082* (2022.01)
*H04L 61/4511* (2022.01)
(Continued)

(52) U.S. Cl.
CPC ........ *H04L 41/082* (2013.01); *H04L 61/4511* (2022.05); *H04L 67/02* (2013.01); *H04L 67/51* (2022.05); *H04L 67/563* (2022.05); *H04W 4/50* (2018.02); *H04W 88/182* (2013.01)

(58) Field of Classification Search
CPC ... H04L 41/082; H04L 61/4511; H04L 67/02; H04L 67/51; H04L 67/563; H04W 4/50; H04W 88/182
See application file for complete search history.

(56) References Cited

U.S. PATENT DOCUMENTS 8,548,487 B2 * 10/2013 Krishnamurthi ...... H04W 64/00
455/433
11,108,866 B2 * 8/2021 Hameleers ............ H04L 67/125
(Continued)

FOREIGN PATENT DOCUMENTS

WO    WO-0237788 A2 *  5/2002  ....... H04L 29/12122

OTHER PUBLICATIONS

International Search Report and Written Opinion dated Jun. 29, 2020 for International Application No. PCT/EP2020/059062 filed Mar. 31, 2020, consisting of 16 pages.
(Continued)

*Primary Examiner* — Sm A Rahman
(74) *Attorney, Agent, or Firm* — Weisberg I.P. Law, P.A.

(57) ABSTRACT

A redirect server is configured in a service-based architecture, SBA, domain of a wireless communication network. The redirect server may receive configuration signaling indicating that a location of a resource or service in the SBA domain has changed from an old location to a new location. The redirect server receives, from a requestor in the SBA domain, a request that targets the old location of the resource or service in the SBA domain. The redirect, responsive to the request, transmits, from the redirect server to the requestor, a response that redirects the requestor to the new location of the resource or service in the SBA domain.

19 Claims, 17 Drawing Sheets

(51) Int. Cl.
    *H04L 67/02*     (2022.01)
    *H04L 67/51*     (2022.01)
    *H04L 67/563*     (2022.01)
    *H04W 4/50*     (2018.01)
    *H04W 88/18*     (2009.01)

(56) References Cited

U.S. PATENT DOCUMENTS

| | | | |
|---|---|---|---|
| 2007/0116011 A1* | 5/2007 | Lim | H04W 8/087 |
| | | | 370/395.52 |
| 2014/0108672 A1 | 4/2014 | Ou et al. | |
| 2015/0012584 A1 | 1/2015 | Lo et al. | |
| 2018/0069837 A1 | 3/2018 | Graham-Cumming | |
| 2018/0367619 A1* | 12/2018 | Jung | H04L 61/58 |

OTHER PUBLICATIONS

3GPP TS 23.502 V15.4.1; 3rd Generation Partnership Project; Technical Specification Group Services and System Aspects; Procedures for the 5G System; Stage 2 (Release 15); Jan. 2019; consisting of 347 pages.

3GPP TS 23.501 V15.4.0; 3rd Generation Partnership Project; Technical Specification Group Services and System Aspects; System Architecture for the 5G System; Stage 2 (Release 15); Dec. 2018; consisting of 236 pages.

3GPP TR 23.742 V16.0.0; 3rd Generation Partnership Project; Technical Specification Group Services and System Aspects; Study on Enhancements to the Service-Based Architecture (Release 16); Dec. 2018; consisting of 131 pages.

3GPP TS 29.501 V15.2.0; 3rd Generation Partnership Project; Technical Specification Group Core Network and Terminals; 5G System; Principles and Guidelines for Services Definition; Stage 3 (Release 15); Dec. 2018; consisting of 66 pages.

3GPP TS 29.500 V1.1.0; 3rd Generation Partnership Project; Technical Specification Group Core Network and Terminals; 5G System; Technical Realization of Service Based Architecture; Stage 3 (Release 15); Apr. 2018; consisting of 23 pages.

European Search Report dated Nov. 10, 2023 for Application No. 20716740.4, consisting of 6 pages.

* cited by examiner

REDIRECT SERVER IN A WIRELESS COMMUNICATION NETWORK

CROSS-REFERENCE TO RELATED APPLICATIONS

This application is a Submission Under 35 U.S.C. § 371 for U.S. National Stage Patent Application of International Application No.: PCT/EP2020/059062, filed Mar. 31, 2020 entitled "REDIRECT SERVER IN A WIRELESS COMMUNICATION NETWORK," which claims priority to European Application No. 19382323.4, filed Apr. 30, 2019, the entireties of both of which are incorporated herein by reference.

TECHNICAL FIELD

The present application relates generally to a wireless communication network, and relates more particularly to a redirect server in such a network.

BACKGROUND

The next generation (5G) wireless communication network will use a service-based architecture that leverages service-based interactions between network functions (NFs). Any given instance of an NF in this regard may take on a producer role in order to provide a service to another NF instance that takes on a consumer role. The producer NF instance may for example provide the service to a consumer NF instance by performing a service operation requested by the consumer NF instance. The service operation may operate on, use, or relate to a certain resource that the producer NF instance stores, maintains, or otherwise manages. In a wireless network, for example, such a resource may be or be related to a certain wireless device's context or packet data session. Regardless, a consumer NF instance that knows of the resource's location can request that the producer NF instance execute the service operation on the resource.

Although the service-based architecture advantageously enables greater flexibility and speed in the development of network services, the service-based architecture nonetheless introduces challenges to cope with scenarios where the resource's location changes. This proves especially challenging in scenarios where the resource's location changes due to decommissioning of the producer NF instance that manages the resource.

[1] 3GPP TS 23.502, V15.4.1 Procedures for the 5G System; Stage 2, available at https://portal.3gpp.org/desktopmodules/Specifications/SpecificationDetails.aspx?specificationId=3145 as of 25 Mar. 2020 defines the Stage 2 procedures and Network Function Services for the 5G system architecture and for the policy and charging control framework.

[2] 3GPP TS 23.501, V15.4.0, System Architecture for the 5G System; Stage 2, available at https://portal.3gpp.org/desktopmodules/Specifications/SpecificationDetails.aspx?specificationId=3144 as of 25 Mar. 2020 defines the Stage 2 system architecture for the 5G System, including both roaming and non-roaming scenarios in all aspects, including interworking between 5GS and EPS, mobility within 5GS, QoS, policy control and charging, authentication and in general 5G System wide features e.g. SMS, Location Services, Emergency Services. The 5G System provides data connectivity and services.

[3] 3GPP TS 23.742, V16.0.0, Study on Enhancements to the Service-Based Architecture, available at https://portal.3gpp.org/desktopmodules/Specifications/SpecificationDetails.aspx?specificationId=3457 as of 25 Mar. 2020 studies and evaluates architecture enhancements on potential optimizations to the Release 15 Service-Based Architecture (SBA) in order to provide higher flexibility and better modularization of the 5G System for the easier definition of different network slices and to enable better re-use of the defined services. Moreover, the technical report considers mechanisms in order to better support automation and high reliability of network function service(s).

[4] 3GPP TS 29.501, v15.2.0, 5G System; Principles and Guidelines for Services Definition; Stage 3, available at https://portal.3gpp.org/desktopmodules/Specifications/SpecificationDetails.aspx?specificationId=3341 as of 25 Mar. 2020 defines design principles and documentation guidelines for 5GP SBI APIs.

SUMMARY

It is an object of the present disclosure to provide a robust system for facilitating continued reachability of resources with minimal impact on consumer standardization.

Some embodiments herein provide a redirect server in a service-based architecture (SBA) domain of a wireless communication network. The redirect server advantageously facilitates continued reachability of a resource or service even after the resource/service is transferred from an old location to a new location in the SBA domain. The redirect server in this regard redirects requests targeting the old location of the resource/service to the new location of that resource or service. The redirect server may be distinct from the producer instance that managed the resource or service at the old location. Accordingly, the redirect server may remain operational for redirection even if that producer instance is decommissioned.

Some embodiments configure the Domain Name Service (DNS) to resolve the old location as an IP address of the redirect server. This way, requests targeting the old location will arrive at the redirect server, which will in turn redirect those requests to the new location.

More particularly, embodiments herein include a method performed by a redirect server in a service-based architecture, SBA, domain of a wireless communication network. The method in some embodiments may include receiving configuration signaling indicating that a location of a resource or service in the SBA domain has changed from an old location to a new location. The method may further include receiving, from a requestor in the SBA domain, a request that targets the old location of the resource or service in the SBA domain. The method may then include, responsive to the request, transmitting, from the redirect server to the requestor, a response that redirects the requestor to the new location of the resource or service in the SBA domain.

Embodiments herein also include a method performed by a reachability controller in a service-based architecture, SBA, domain of a wireless communication network. The method may include configuring a DNS server to resolve an old location of a resource or service in the SBA domain into an address of a redirect server in the SBA domain. The method may alternatively or additionally include configuring the redirect server to redirect a request targeting the old location of the resource or service to a new location of the resource or service.

Embodiments further include a method performed by a requestor in a service-based architecture, SBA, domain of a wireless communication network. The method includes transmitting, from the requestor to a domain name system, DNS, server in the SBA domain, a DNS request to resolve an old Uniform Resource Identifier, URI, of a resource or service in the SBA domain. The method may also include receiving, from the DNS server, a response to the DNS request that indicates an address of a redirect server in the SBA domain. The method may then include transmitting, from the requestor to the address of the redirect server, a service request that targets the old URI of the resource or service. The method may also include receiving, from the redirect server, a response to the service request that redirects the requestor to a new URI of the resource or service in the SBA domain. In some embodiments, the method may further include transmitting, from the requestor to the DNS server, another DNS request to resolve the new URI of the resource or service and receiving, from the DNS server, a response to the another DNS request that indicates a new address. The method may finally include transmitting, from the requestor to the new address, a service request that targets the new URI of the resource or service in the SBA domain.

Embodiments further include a method performed by a wireless communication network. The method may comprise: configuring, by a reachability controller, a Domain Name Service, DNS, server to resolve an old location of a resource or service in a service-based architecture, SBA, domain of the wireless communication network into an address of a redirect server in the SBA domain; transmitting, from a requestor to the DNS, server in the SBA domain, a DNS request to resolve an old location, of a resource or service in the SBA domain; receiving, at the DNS server the DNS request, and returning the address of the redirect server; and receiving, at the requestor from the DNS server, a response to the DNS request that indicates an address of a redirect server in the SBA domain.

Embodiments herein further include corresponding apparatus, computer programs, wireless communication networks and computer-readable storage mediums.

DETAILED DESCRIPTION

Figure 1:
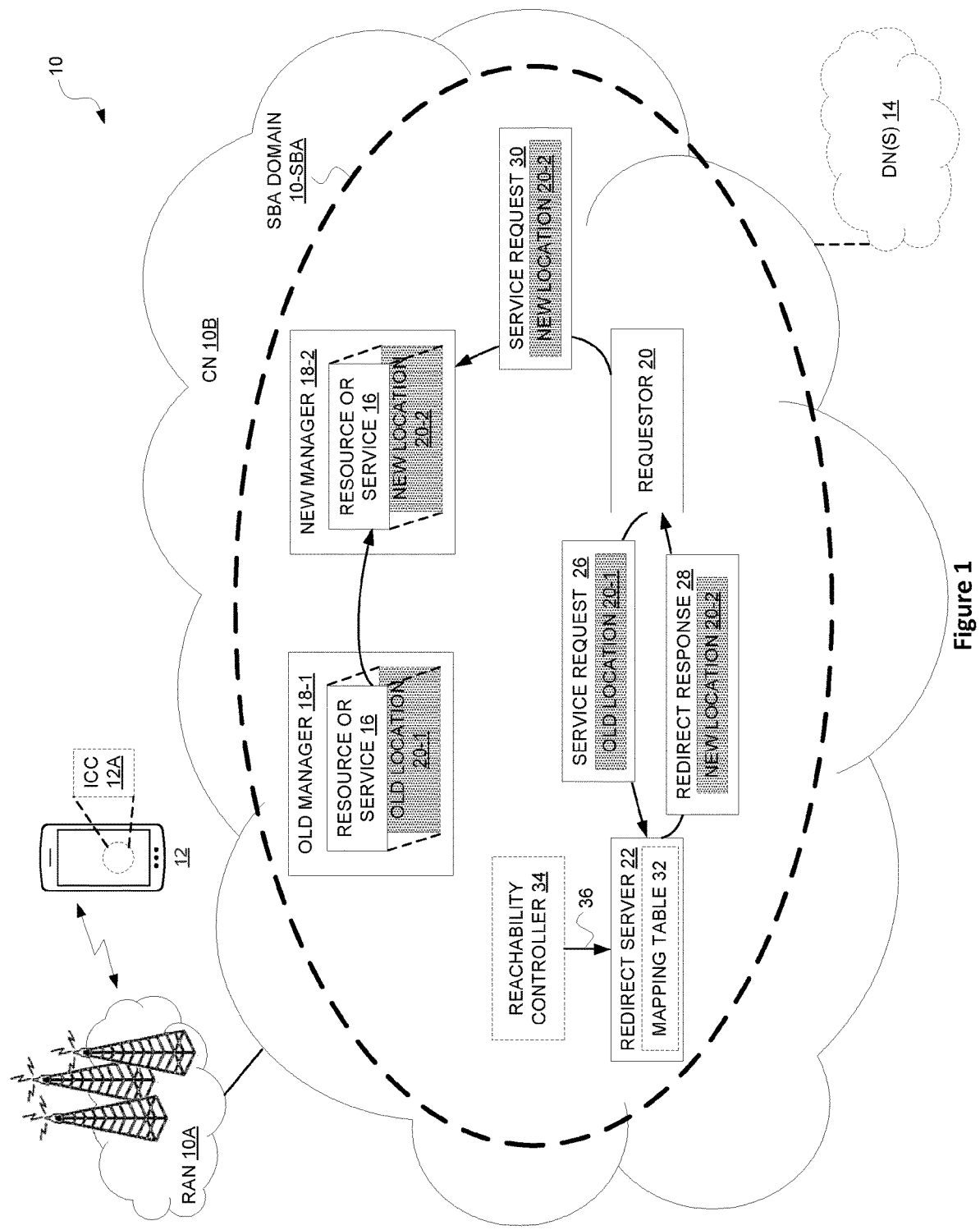
FIG. 1 is a block diagram of a wireless communication network according to some embodiments.

FIG. 1 shows a wireless communication network 10 (e.g., a 5G network) according to some embodiments. At least a portion of the wireless communication network 10 uses a service-based architecture (SBA) that leverages service-based interactions between network functions (NFs). The portion of the network 10 that uses an SBA is referred to as an SBA domain 10-SBA of the network 10.

FIG. 1 for example shows that, in some embodiments, the network 10 includes a radio access network (RAN) 10A and a core network 10B. The RAN 10A wirelessly communicates with a wireless device 12 and connects the wireless device 12 to the CN 10B. The CN 10B may in turn connect the wireless device 12 to one or more data networks 14, e.g., the Internet, a public switched telephone network (PSTN), etc. In this case where the network 10 may be functionally or logically separated into a RAN 10A and a CN 10B, the SBA domain 10-SBA may include at least a portion of the CN 10B.

Within the SBA domain 10-SBA, NFs each have defined functional behavior and defined interfaces. Where the network 10 is a 5G system, for instance, NFs in the SBA domain 10-SBA may include an access and mobility management function (AMF), a session management function (SMF), a policy control function (PCF), an authentication server function (AUSF), and a unified data management (UDM) function, to name a few. Regardless, the network 10 in some embodiments may instantiate any given NF as multiple NF instances and/or service instances. Indeed, an NF in some embodiments may be implemented by network equipment as a network element on dedicated hardware, as a software instance running on dedicated hardware, or as a virtualized function instantiated on an appropriate platform, e.g., on a cloud infrastructure.

Each NF instance or service instance may expose its functionality through a service-based interface for consumption by other authorized NFs. Any given instance of an NF or service may accordingly take on a producer role in order to provide a service to another NF instance or service that takes on a consumer role. The producer instance may for example provide the service to the consumer instance by performing a service operation requested by the consumer instance. The service operation may operate on, use, or relate to a certain resource that the producer instance stores, maintains, or otherwise manages. A consumer instance that knows of the resource's location can request that the producer instance execute the service operation on the resource.

Indeed, in some embodiments, the location of a resource or service represents the means of acting upon or obtaining the resource or service. The location may for example specify the access mechanism and network location for the resource or service, e.g., as specified in an HTTP Resource Location field that provides the location of an HTTP resource. In one or more embodiments, the location of the resource or service may be indicated by an identity or address of the resource manager that manages the resource or service, e.g., a network function instance. The location may alternatively or additionally be indicated by a Uniform Resource Identifier (URI) for the resource or service.

The location of a resource or service, however, may change. FIG. 1 in this regard shows an example where a resource or service 16 is transferred from being stored, maintained, or otherwise managed by an old manager 18-1 (e.g., an old producer NF/service instance) to being stored, maintained, or otherwise managed by a new manager 18-2 (e.g., a new producer NF/service instance). As a result, the location of the resource or service 16 changes from an old location 20-1 (e.g., an old URI) at the old manager 18-1 to a new location 20-2 (e.g., a new URI) at the new manager 18-2.

This location change may occur for any number of reasons. In one embodiment, for example, the resource or service 16 is or is related to a context of the wireless device 12 and/or a packet data session of the wireless device 12. The resource or service 16 may therefore be or be related to information needed to maintain service towards the wireless device 12, including for instance mobility state information, security information, capability information, one or more identities associated with the wireless device and/or associated with a connection for the wireless device, or the like. A change in the location of this and other types of resource or service 16 may thereby change because of mobility of the wireless device 12, load balancing in the network 10, failure of the old manager 18-1, decommissioning of the old manager 18-1, or the like.

Some embodiments herein provide a redirect server 22 in the SBA domain 10-SBA. The redirect server 22 advantageously facilitates continued reachability of the resource or service 16 even after the resource or service 16 is transferred from the old location 20-1 to the new location 20-2. In fact, the redirect server may be distinct from the old manager 18-1 that managed the resource or service 16 at the old location 20-1. Accordingly, the redirect server 22 may remain operational even relocation of the resource or service 16 is attributable to the old manager 18-1 being decommissioned.

As shown in this regard, a requestor 24 (e.g., a consumer NF/service instance or other communication entity in the SBA domain 10-SBA) intends to request that a service operation be executed on or with the resource or service 16. The requestor 24 therefore transmits a service request 26 requesting this service operation. Unaware of the change in the location of the resource or service 16, though, the service request 26 targets the old location 20-1 (e.g., old URI) of the resource or service 16. The redirect server 22 effectively intercepts this service request 26, as explained more fully below. Responsive to the service request 26, the redirect server 22 transmits a response 28 that redirects the requestor 20 to the new location 20-2 of the resource or service 16 in the SBA domain 10-SBA. Where the service request 26 is a HyperText Transfer Protocol (HTTP) request, for instance, the response 28 may be an HTTP 301 Redirect message. Regardless, complying with this redirection, the requestor 20 then transmits another server request 30 that targets the new location 20-2 (e.g., new URI) of the resource or service 16.

In some embodiments, the redirect server 22 provides this redirection through the use of a mapping table 32 at the redirect server 22. The redirect server 22 may for instance store, in the mapping table 32, a mapping from the old location 20-1 to the new location 20-2. Then, responsive to receiving the service request 26, the redirect server 22 may determine from the mapping table 32 the new location 20-2 from which the old location 20-1 maps.

The configuration of the redirect server 22 to provide redirection in this or another way is accomplished in some embodiments via a reachability controller 34 in the network 10. In some embodiments, the reachability controller 34 is or is implemented by a network node or function responsible for operation and maintenance (O&M) in the wireless communication network 10. In other embodiments, the reachability controller 34 is or is implemented by the old manager 18-1 or the new manager 18-2. Regardless, the reachability controller 34 according to some embodiments transmits configuration signaling 36 that configures the redirect server 22 to provide redirection from the old location 20-1 to the new location 20-2. For example, the configuration signaling 36 may indicate that the location of the resource or service 16 has changed from the old location 20-2 to the new location 20-2. The reachability controller 34 may thereby configure the redirect server 22 to redirect a request targeting the old location 20-1 of the resource or service 16 to the new location 20-2 of the resource or service 16.

In some embodiments, the reachability controller 34 configures the redirect server 22 in this way responsive to receiving notice or otherwise determining that the resource or server 16 is no longer, or will no longer be, available at the old location 20-1, e.g., because the old manager 18-1 has or is to be decommissioned. The reachability controller 34 may for instance receive control signaling indicating this from the old manager 18-1, the new manager 18-2, or some other node or function in the SBA domain 10-SBA such as a network repository function (NRF).

In some embodiments, the redirect server 22 receives configuration signaling from the old manager 18-1, the new manager 18-2, or some other node or function in the SBA domain 10-SBA indicating the old location 20-1, the new location 20-2, and/or that requests targeting the old location 20-1 are to be redirected to the new location 20-2. Alternatively or additionally, the redirect server 22 may determine this mapping of the old location 20-1 to the new location 20-2 itself.

In one embodiment, for instance, the redirect server 22 receives, from the old manager 18-1, information indicating one or more key values associated with the resource or service 16 and indicating the old location 20-1. Where the resource or service 16 is or relates to a context for the wireless device 12 or session, for example, the key value(s) may include a subscription permanent identifier (SUPI) that identifies a subscription to which the resource or service 16 relates. This SUPI may for instance be an International Mobile Subscriber Identity (IMSI) and be stored on an integrated circuit card (ICC) 12A, e.g., which may be removably inserted in, or embedded in, the wireless device 12. Alternatively or additionally, the key value(s) may include a session identifier that identifies a session to which the resource or service 16 relates. No matter the particular key value(s), though, the redirect server 22 may also receive, from the new manager 18-1, information indicating the same one or more key values associated with the resource or service 16 and indicating the new location 20-2. The redirect server 22 may then determine a mapping of the old location 20-1 to the new location 20-2 based on this information received from the old manager 18-1 and the new manager 18-2, e.g., based on the information received from the old manager 18-1 relating to the same key value(s) as that received from the new manager 18-2.

Figure 2:
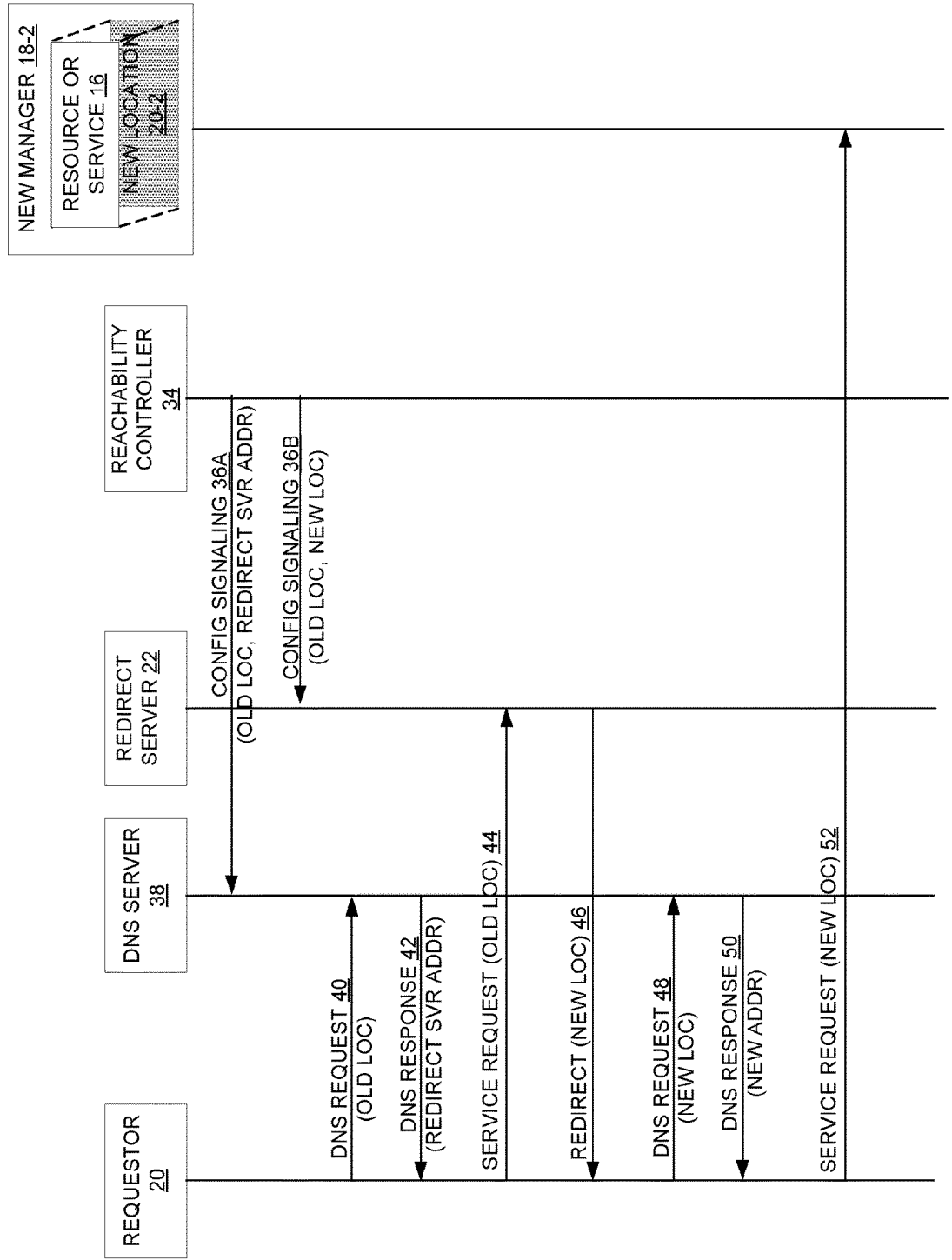
FIG. 2 is a call flow diagram for redirection according to some embodiments.

Consider now additional details for how the redirect server 22 effectively intercepts the service request 26 from the requestor 20 according to some embodiments. In one or more embodiments, the same or a different reachability controller 34 configures a Domain Name Service (DNS) server to resolve the old location 20-1 of the resource or service 16 into an address (e.g., Internet Protocol, IP, address or apiroot) of the redirect server 22. FIG. 2 illustrates one example of these embodiments.

As shown, the reachability controller 34 transmits configuration signaling 36A to the DNS server 38 indicating the old location 20-1 (e.g., old URI or apiroot) of the resource or service 16 as well as the address of the redirect server 22 into which the DNS server 38 is to resolve the old location 20-1. The reachability controller 34 also transmits configuration signaling 36B to the redirect server 22 indicating that the redirect server 22 is to redirect requests targeting the old location 20-1 to the new location 20-2.

Correspondingly, when the requestor 20 transmits a DNS request 40 to the DNS server 38 requesting that the DNS server 38 resolve the old location 20-1, the DNS server 38 transmits a response 42 that indicates the redirect server's address. The requester 20 therefore transmits the service request 44 targeting the old location 20-1 to the redirect server 22, rather than to the old manager 18-1 which managed the resource or service 16 at the old location 20-1. The reachability controller 34 in this way exploits the DNS server 38 to enable the redirect server 22 to field the service request 44 targeting the old location 18-1. Responsive to the service request 44, though, the redirect server transmits a response 46 that redirects the requester 20 to the new location 18-2 of the resource or service 16.

In some embodiments, this prompts the requestor 20 to send another DNS request 48 to the DNS server 38 requesting that the DNS server 38 resolve the new location 20-2. In response, the DNS server 38 transmits a response 50 that indicates an address (e.g., IP address or apiroot) of the new manager 18-2. The requester 20 therefore now transmits a service request 52 targeting the new location 20-2 to the new manager 18-2.

Note that the old manager 18-1 and/or the new manager 18-2 according to some embodiments may correspond to any type of network function in the network 10, including those that are not involved in device mobility. For example, in some embodiments, the old manager 18-1 and/or the new manager 18-2 takes the form of an authentication server function, a network exposure function, a network repository function, a network slice selection function, a policy control function, a unified data management function, a user plane function, an application function, a network data analytics function, or a charging function. In these and other embodiments, then, the old manager 18-1 and/or the new manager 18-2 may be a network function other than a session management function (SMF), an access and mobility function (AMF), and a short message service function (SMSF).

Additional embodiments will now be described. At least some of these embodiments may be described as applicable in certain contexts and/or wireless network types for illustrative purposes, but the embodiments are similarly applicable in other contexts and/or wireless network types not explicitly described.

The next generation (5G) of network architecture is defined in 3GPP Release 15, e.g. as specified in 3GPP Technical Specification (TS) 23.502 v.15.5.0 and TS 23.501 v15.5.0. One aspect in which the 3GPP networks will differ starting from Release 15 is that the core network (CN) architecture is mostly built around the Service-Based Architecture (SBA) paradigm. That is, there will be a network domain in which the different functional components are defined as services. Services are self-contained functionalities that can be changed and modified in an isolated manner (without affecting the others). A service may for instance be designed to perform specific tasks, have a unique identification, and be designed to operate on a specific set of data (e.g., data context). Within a given communication context, a service may take the role of either service consumer or service producer. A service consume may be unaware of any internals of the service producer, and vice versa. A service instance may be a software executable that implements a service.

The services in 5GC will likely be built in a stateless way, i.e., the business logic and data context will be separated. This means that the services store their context externally in a proprietary database (DB). This will enable various cloud infrastructure features like auto-scaling or auto-healing.

Apart from that, services will be deployed as part of NFs (Network Functions). An NF is a processing function in the network with defined functional behavior and interfaces. An NF can be implemented either as a network element on dedicated hardware, as a software instance running on dedicated hardware, or as a virtualized function instantiated on an appropriate platform (e.g., on cloud infrastructure). An identifiable instance of a NF is referred to as a NF instance. An NF service refers to functionality exposed by a NF through a service-based interface and consumed by other authorized NFs. An NF service instance refers to an identifiable instance of an NF service, while an NF service operation refers to an elementary unit of which an NF service is composed.

Figure 3:
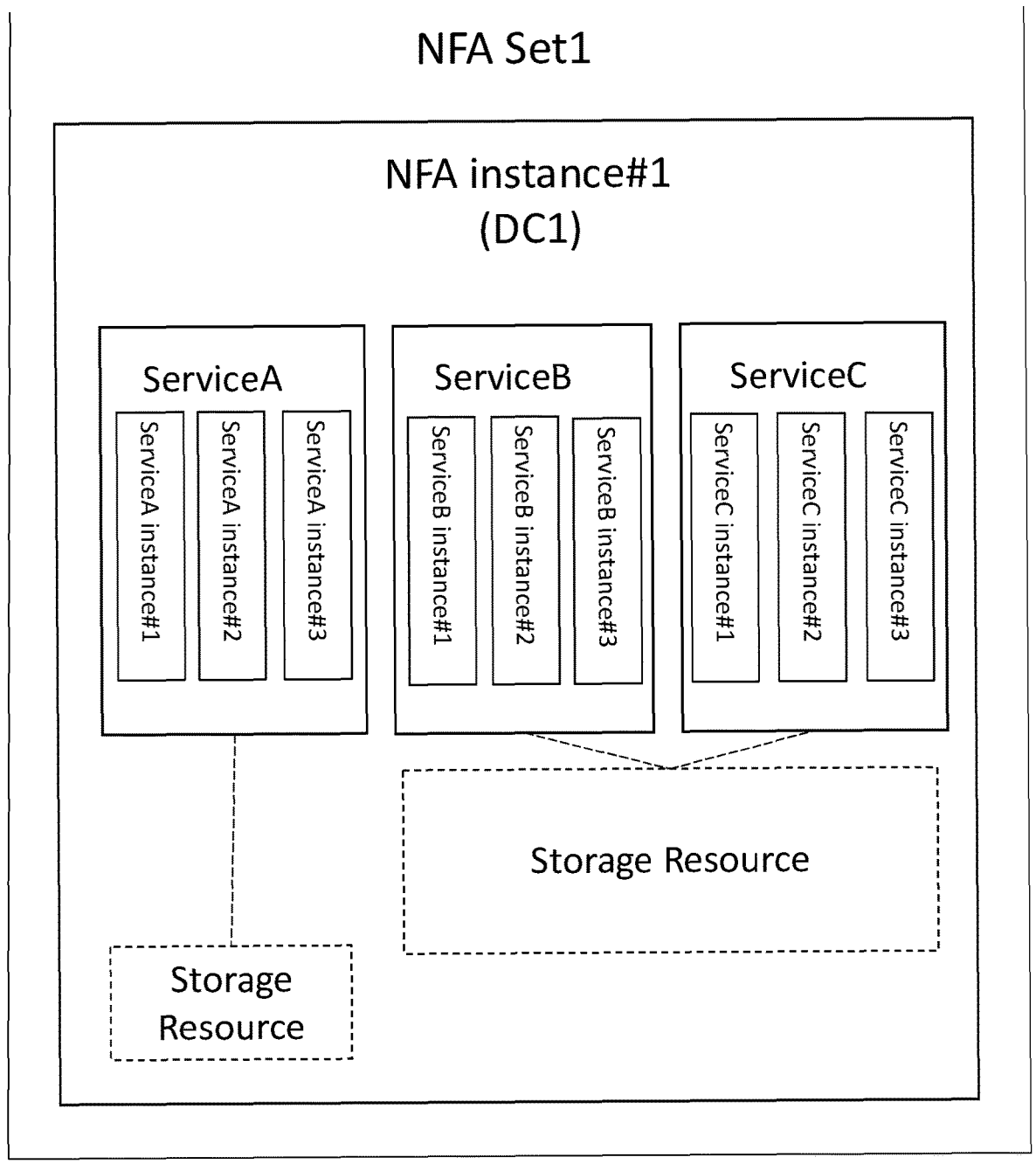
FIG. 3 is a block diagram of an NF instance according to some embodiments.

In some embodiments, one NF instance may provide multiple services. As shown in FIG. 3, for example, NF instance #1 may provide Service A, B, and C. Moreover, NF Instance #1 in this example is provided by a single vendor at a single data center (DC). FIG. 3 also shows that each service is instantiated in a pool. Service A for example is instantiated as service instances 1, 2, and 3. These service instances 1, 2, and 3 for Service A may each have access to a common storage resource. FIG. 3 also shows that Services B and C are instantiated in a pool, which the services instances of each Service having access to a shared storage resource that is shared between Services B and C.

Figure 4:
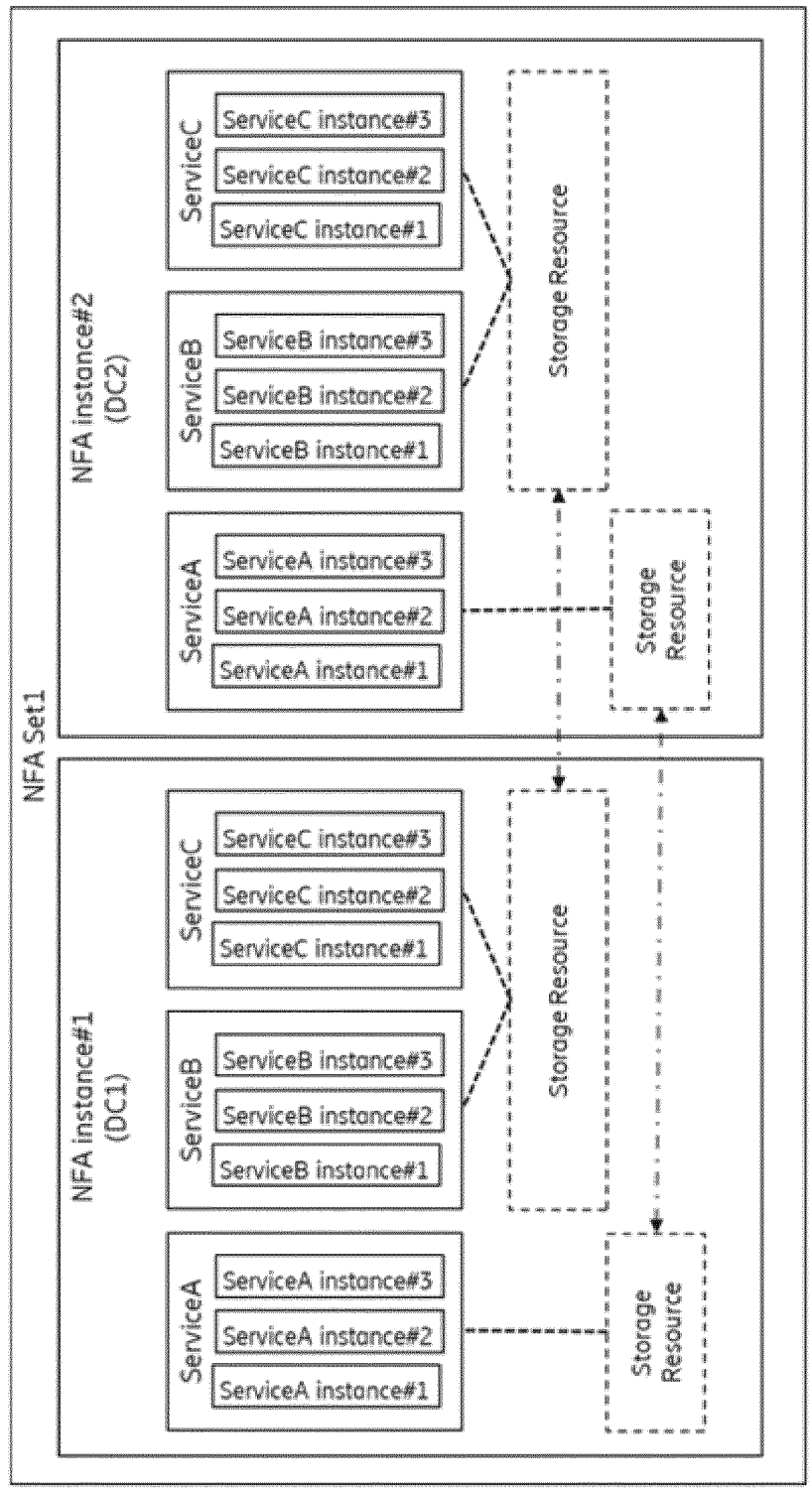
FIG. 4 is a block diagram of an NF set according to some embodiments.

In some embodiments, multiple NF instances may be deployed in a Set, e.g., as described in 3GPP TS 23.742 v16.0.0. Such an NF set may include a group of interchangeable NF instances of the same type, supporting the same services and the same network slice(s). The multiple NF instances in the Set may provide the same business logic and may have access to the same context data. The access to the same data may be by different means, providing different levels of data consistency, e.g. if replication is required among locally deployed storage resources, this replication may be synchronous or asynchronous. In some embodiments, at least some of the NF instances in the Set may be deployed at the same data center (DC), by the same vendor, and/or be co-located geographically. In other embodiments, such as those shown in FIG. 4, at least some of the NF instances in the Set may be deployed at different DCs, by different vendors, and/or be geographically distributed.

Figure 5:
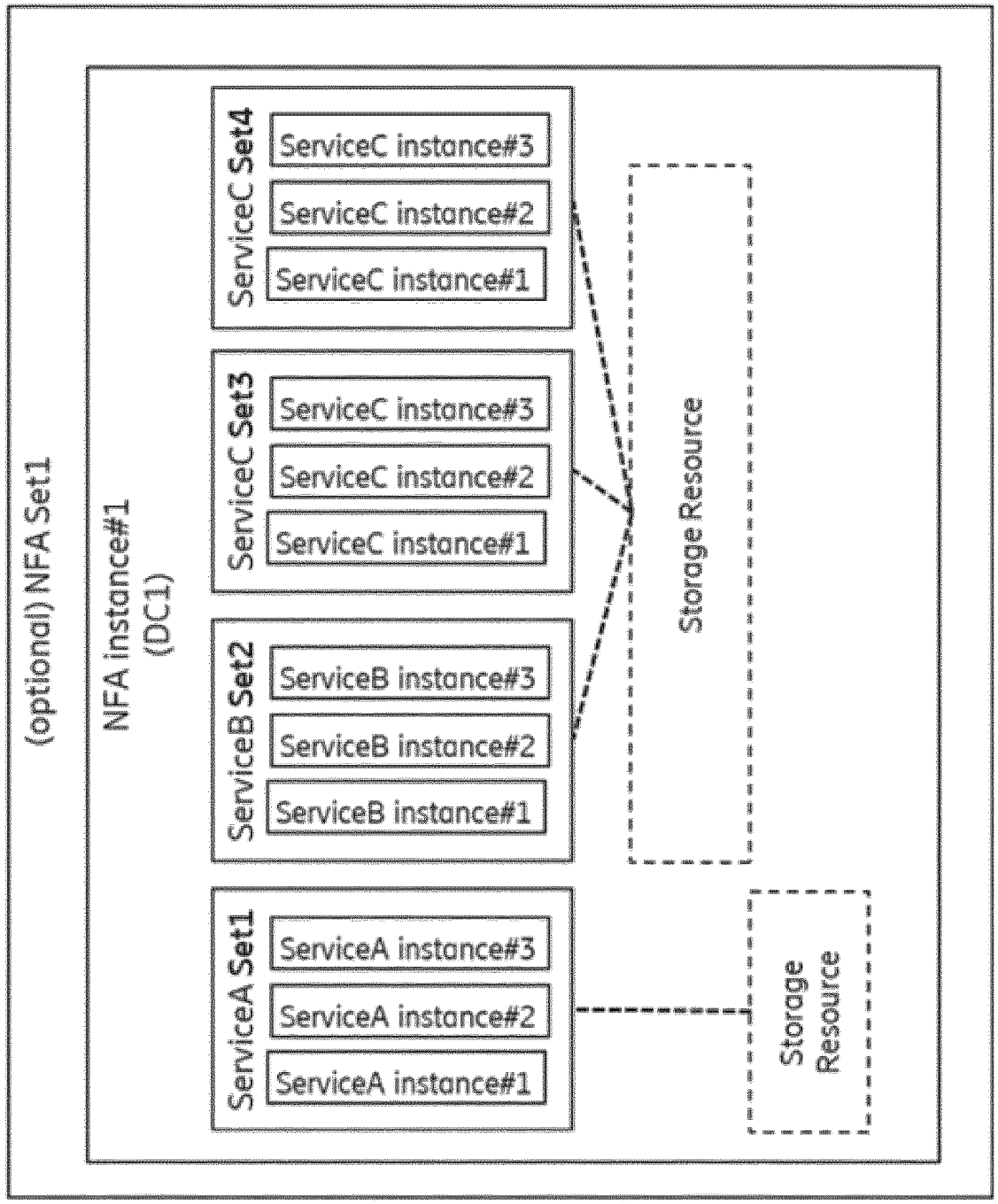
FIG. 5 is a block diagram of an NF service set according to some embodiments.

Some embodiments may also include one or more Service Sets. An NF Service Set is a group of interchangeable NF service instances of the same service type within an NF instance. The NF service instances in the same NF Service Set have access to the same context data. FIG. 5 shows one example. One difference between FIG. 3 and FIG. 5 is that, in FIG. 5, the Service Set construct is standardized, while in FIG. 3 the internal pool of instances is managed internally to the NF instance.

Within this setting, a consumer service may trigger the creation of a resource in a producer service. The resource may be either an individual resource or a structured resource that can contain one or more child resources. A URI uniquely identifies this resource. This URI should be used in all subsequent consumer requests to uniquely identify a resource dynamically created in a specific NF (service) instance/API. The resource URI is structured as: {apiRoot}/{apiName}/{apiVersion}/{apiSpecificResourceUriPart}.

Here, "apiRoot" shall be a concatenation of the following parts: (i) scheme ("http://" or "https://"); (ii) authority (host and optional port) as defined in IETF RFC 3986; and (iii) an optional deployment-specific string that starts with a "/" character. The last part of the resource URIs (apiSpecificResourceUriPart) is locally significant, i.e., it is allocated by the hosting NF (service). The full resource URI is sent back to the Consumer creating the resource in the successful HTTP POST response in the Location HTTP field. The Consumer can then store it and use the URI for all subsequent operations targeting the given context. This is what is named in 3GPP as "binding" from the consumer to the created resource.

There currently exist certain challenge(s). An operator may desire to deploy at least two different Sets of the same NF type, each one possibly by different vendors. The operator may further desire to have the chance to transfer some information related to the context stored in Set1 (e.g. UE or/and PDU session related) to Set2 with the intention to continue handling the context at Set 2. The context data that is required to be transferred may vary, but in any case, it should be enough to allow the receiver Set (Set2) to re-build the processing state as close as it was in Set1; that is, to allow the receiver to restore internal business logic state in order to continue processing.

Achievement of this may be based on a standardized subset of attributes to be transferred or each specific context to be transferred, which is not identical, but may be mapped to a subset of the e.g. UE-related and/or PDU Session data stored in the NFs. The intention is to transfer a limited amount of context data, but enough for the receiver to restore internal business logic state. A desirable feature of the transfers would be to impact the SBA services business logic as little as possible, that includes also the SBIs provided and the service operations involving those SBIs.

The context to be transferred may not only be the data required for the operation execution, but as well any associated data (e.g. data that may be used by other services as well) that needs to be transferred at the same time to ensure consistency.

This issue to solve applies to the context to be transferred between services: (i) belonging to a NF instance; (ii) where the NF instances may be organized in NF Sets; (iii) deployed as individual Service instance; and/or (iv) being part of a Service Set.

Figure 6:
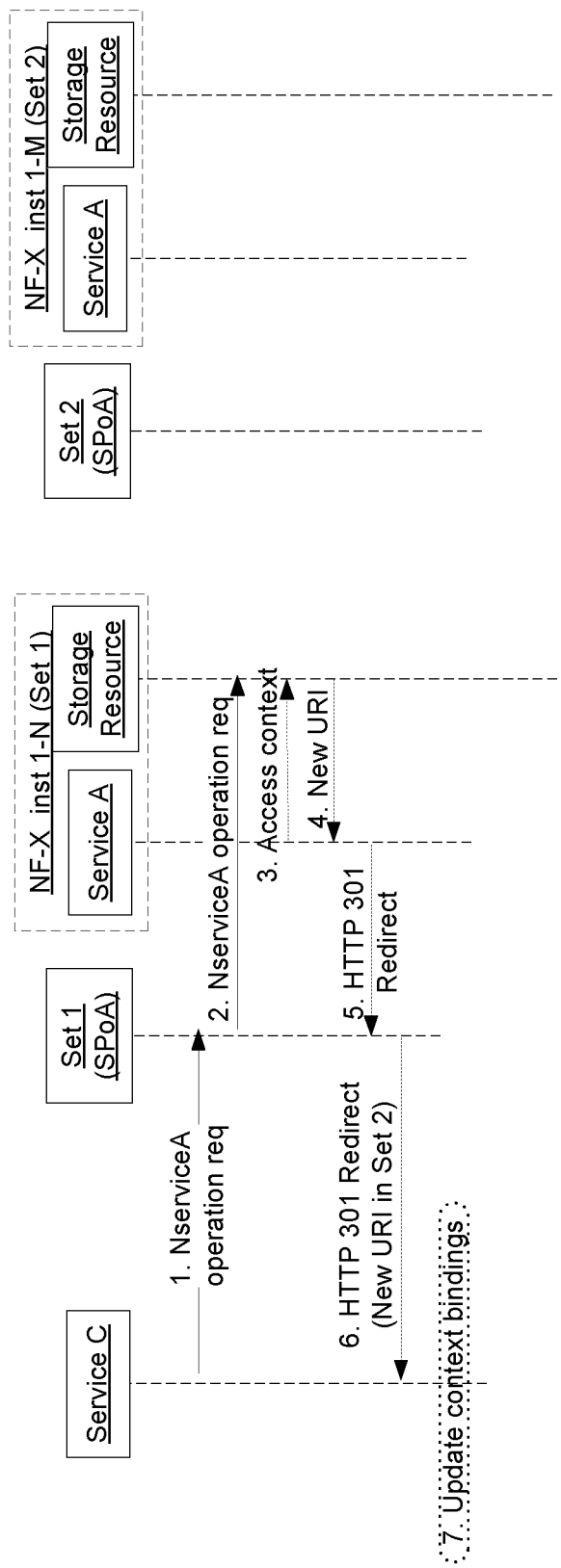
FIG. 6 is a call flow diagram for redirection by the producer instance itself according to some embodiments.

The result of the above is that, in the case of context transfer, the resource Uniform Resource Identifier (URI) for the context (both the apiRoot and apiSpecificResourceUriPart) changes. The Consumers of the context that could potentially store the resource URI in their cache thus should be informed by some means that the reachability of the context has changed. One possibility, as shown in FIG. 6, is that the new resource URI created by the Destination NF (service) is conveyed to the Sender NF (service) and then the Sender responds with a permanent redirect message (HTTP 301) for all subsequent requests coming from the Consumers. This would enable Consumers to update their bindings based on the new URI received.

The above method for informing Consumers solves various use cases, e.g., context move due to load/resource (re-)balancing or context transfer due to the NF instance previously selected becoming unsuitable/not optimal (e.g., UE enters a different service 'area', locality), but it fails to work in a specific use case: when the Sender NF is to be totally decommissioned. In that case, the Sender cannot react to Consumer requests to the old URI.

Certain aspects of the present disclosure and their embodiments may provide solutions to these or other challenges. Some embodiments propose an additional entity in the SBA system, called Redirect Server, that implements a mapping table of the Old resource URIs (i.e., the resource URIs of the transferred context in the Sender NF (service) before the transfer) and the New resource URIs (i.e., resource URIs of the transferred context in Destination NF). It is ensured that Consumer requests towards the Old resource URIs reach the Redirect Server. Upon receiving the requests, the Redirect Server then looks up in its mapping table for the New resource URI and responds to the request with a redirect message pointing to the New resource URI.

This method provides the consumers the information about the new Set to be used for a context that has been transferred from a former Set that has been decommissioned afterwards, allowing to swap.

Certain embodiments may provide one or more of the following technical advantage(s). Some embodiments have one or more of the following advantages. Some embodiments provide a mean to inform consumers of a context (in a producer) that the context is moved to another destination. Some embodiments allow a unique and common consumer behavior (i.e. follow redirections) which could be used for all potential use cases of context transfer: i.e. not only for redirection for a context transfer per request (as shown in FIG. 6), but as well in case of NF/service decommissioning. That is, some embodiments provide a natural extension of the redirect-based method, in case Sett is set to unavailable by controlled means (e.g. planned software upgrade), in order to inform Consumers about the new resource URI when context is transferred to an alternative Set2 (for the same NF type but a different vendor). By this, some embodiments allow e.g. a vendorX NFtype1 is upgraded while other vendorY keeps providing NF services; may simplify break-ins. Alternatively or additionally, some embodiments may be implemented with minimal impact on consumer standardization. As a minimum, only the Consumer logic to support redirections and update context bindings based on the location received may be prescribed by the standard (alternative 2 in description of FIG. 8).

Figure 7:
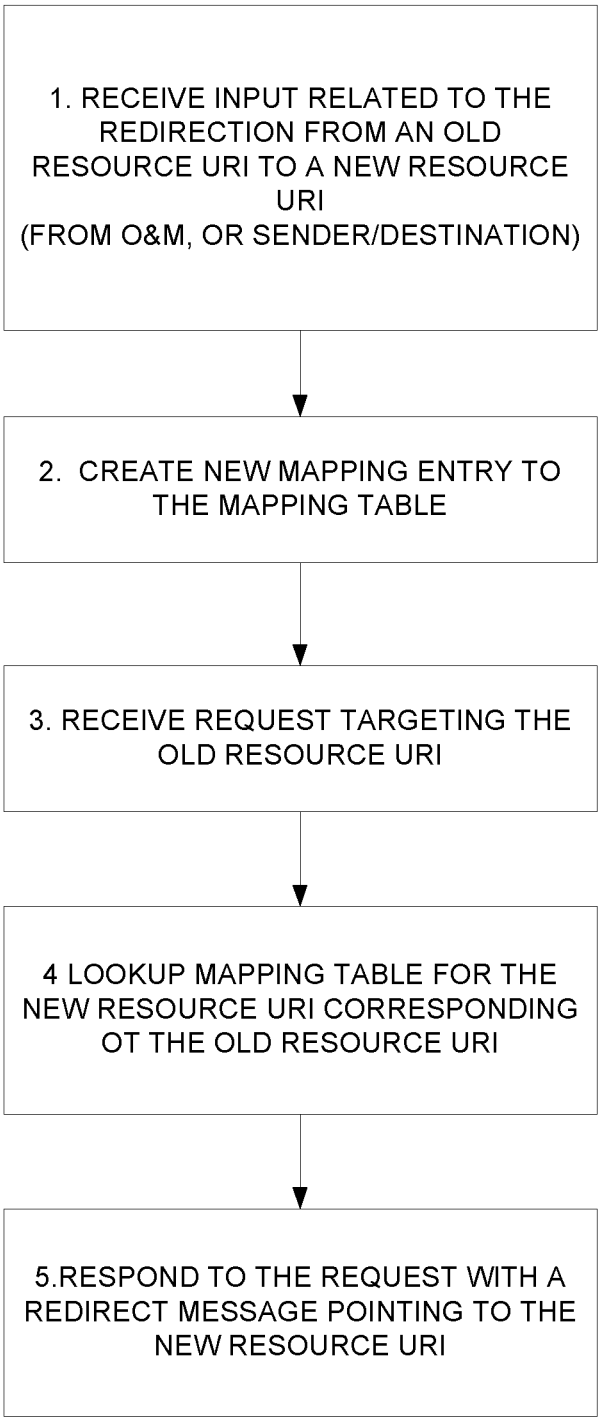
FIG. 7 is a logic flow diagram of a method performed by a redirect server according to some embodiments.

FIG. 7 shows a flowchart implemented by the Redirect Server for some embodiments. Note that the "mapping table" entry created in Step 2 contains the mapping from the Old resource URI to the New resource URI, which may consist of the following information:

{apiRoot_Old}/{apiName}/{apiVersion}/{apiSpecificResourceUriPart_Old} to {apiRoot_New}/{apiName}/{apiVersion}/{apiSpecificResourceUriPart_New}

The above mapping assumes that apiVersion of the Old and New services is the same. Note that in the case when different apiVersions are compatible from the context transfer perspective, the apiVersion may also change. This does not impact the applicability of some embodiments.

Figure 8A:
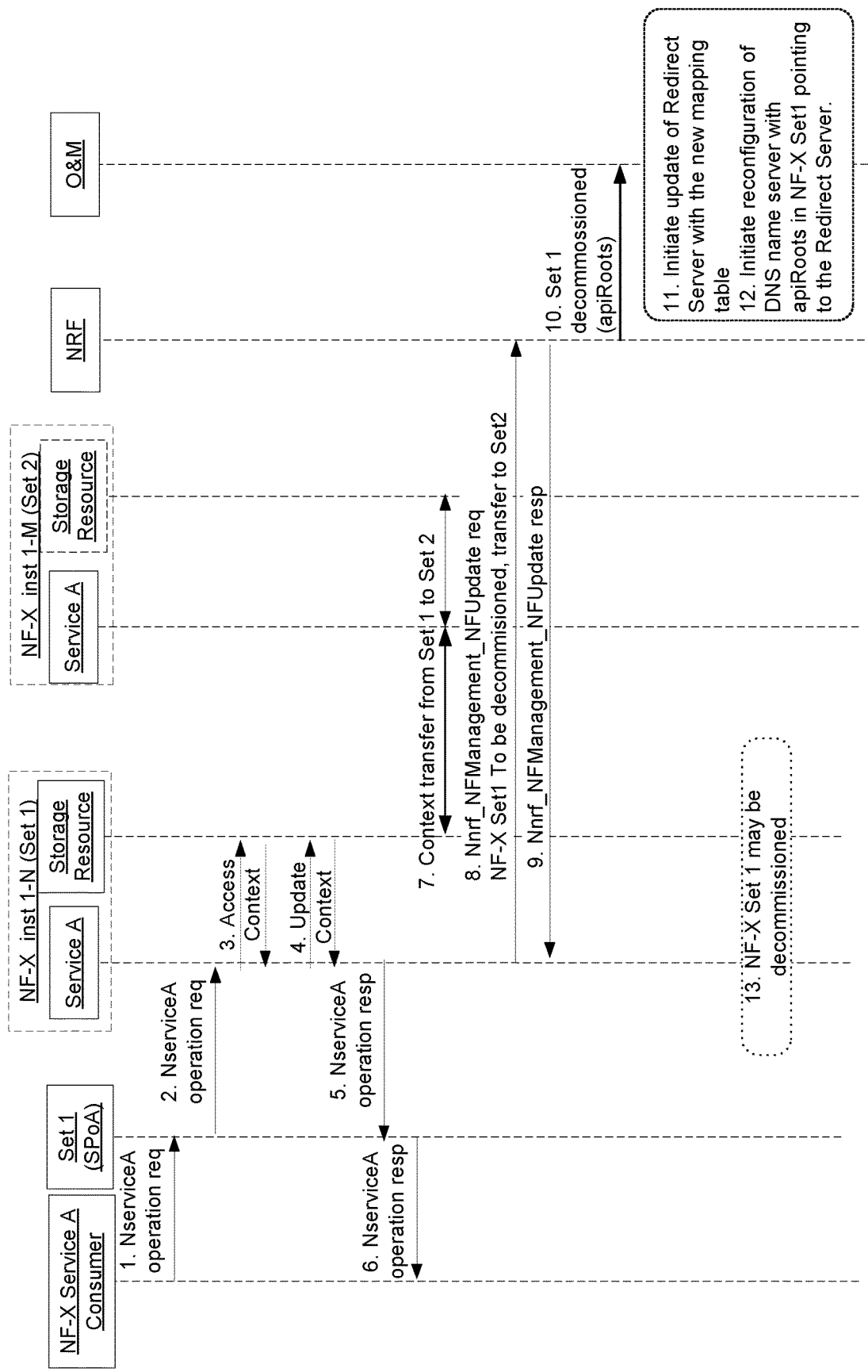
FIGS. 8A-8B show a call flow diagram for redirection by a redirect server according to some embodiments.
Figure 8B:
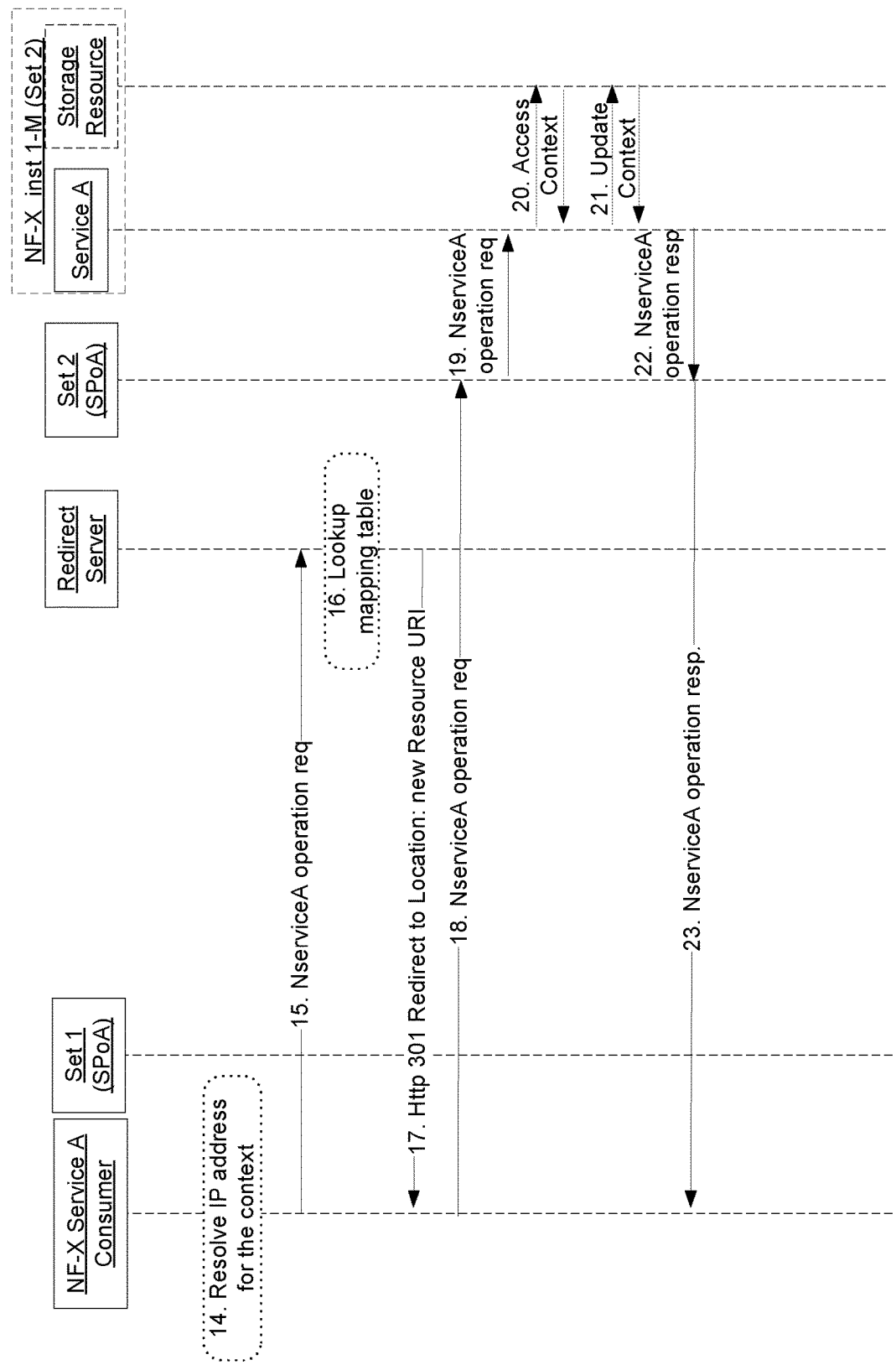

FIGS. 8A-8B shows an example sequence diagram that accomplishes the above functionality when NF-X set (as an example of old manager 18-1) is decommissioned.

Steps 1-6 depict legacy operation of the system, showing communication patterns to/for NF Instance-X set 1 before context is transferred.

Step 1. An NF-X Service A Consumer (as an example of requestor 20 in FIG. 1) requests a Service A operation, that is sent to an address resolved from the Old resource URI. This address in the example identifies a SPoA (Single Point of Access) of NF-X Set 1 (as an example of the old manager 18-1), but as an alternative it could be the address of one instance of Service A.

Step 2. Any instance of Set 1 is potentially reachable. One instance in the Set may be selected based on different criteria (e.g. load). One instance in Set 1 is attempted to be selected and the request is forwarded to this one.

Step 3. (Optional). Context data may be read from the Storage Resource of this Set. This is the unique place where this context (as an example of the resource 16) is stored and up to date. Note that the Storage resource is shown as being part of the NF set. This is rather a logical relation showing that only the NF instances of a given Set may reach it. However, the Storage resource can be a separate entity, e.g., Unified Data Storage Function (UDSF).

Step 4. (Optional). After the instance executes its business logic if the context is modified, it has to be updated in the Storage Resource.

Step 5-6. Successful response

Steps from 1 to 6 describe a basic behavior when a Consumer wants to reach Service A (NF-X) for a given Context.

Step 7: Context transfer from Set 1 to Set 2. This includes also context activation and changing the Context URI to a New resource URI. There may be different methods to achieve that, potentially involving additional Context transfer services in the Sender and Destination NF, respectively.

Steps 8-9: The NF-X Set 1 (Context transfer service in this example) sends an NF update request to the Network Repository Function (NRF), specifying that it is going to be decommissioned and (optionally, see Step 10) also specifying the destination Set, Set 2 for the transfer. Set 2 here is an example of the new manager 18-2. From this moment, no Consumers will discover Set 1 for any communication.

Steps 10-12: It is ensured that the Redirect Server will be used for any subsequent requests targeting the Old resource URI; that is, all apiRoots in NF-X Set1 are set to reach Redirect Server. Besides, it is also ensured that the Redirect server knows where to redirect these messages, i.e., Set 2 in this example.

Alternatives for Steps 8-12:

Alternative 1 (shown in the figure) accomplishes this by Operations and Maintenance (O&M)—from NRF. In this alternative, in step 10, once NRF receives step 8, the NRF notifies O&M about the NF-X Set1 to be decommissioned. Then O&M is responsible for updating the Domain Name Service (DNS) to point to the IP address of the redirect server for the involved apiroots; and updating the Redirect Server with the new mapping table entry, as commented above: {apiRoot_Old}/{apiName}/{apiVersion}/{apiSpecificResourceUriPart_Old} to {apiRoot_New}/{apiName}/{apiVersion}/{apiSpecificResourceUriPart_New} For the Redirect Server update, the O&M system should contact either Set 1 or Set 2 to get the information. The resource URIs are sent from the Destination to the Sender (or vice versa) during context transfer so the mapping table is practically available in one of the two NF Sets, but this variant does not require the mapping table to be stored in either Set1 or Set2. This requires that service A (the one that transfers context) make accessible to O&M all this information. The methods to do so are multiple (e.g. SNMP). Another possible alternative is that O&M may even get part of the information from Set1 and other from Set2 e.g., the O&M system may get the details of the recently transferred context from Sets 1 and 2 (including the generic keys) and match the Old and New resource URIs received from the Sender and Destination, respectively, based on the generic keys (SUPI, SessionlD, etc) of the corresponding contexts.

Alternative 2 accomplishes this by O&M—from Sender (or Destination). Here, NRF is left out completely from the procedure. O&M is notified by the Sender (or Destination) directly and then proceeds with updating the DNS to point to the IP address of the redirect server for the involved apiroots and updating the Redirect Server with the new mapping table entry using one of the variants described above. The advantage of this method is that it does not require steps 8 and 9 at all, and thereby avoids standardization of these NRF procedures.

Alternative 3 accomplishes this by a Redirect Server SBI used by Sender (or Destination). Here, it is the Sender or alternatively the Destination that is responsible for updating the DNS to point to the IP address of the redirect server for the involved apiroots; and updating the Redirect Server with the new mapping table entry, Redirect Server provides an SBI and operations through which it can be directly configured by the Sender (Set 1) NF/service or alternatively by Receiver (Set2) NF/service. This alternative assumes that Sender receives the New resource URIs from the Receiver, or alternatively, the Destination (Set 2) builds the mapping table from the information received. This alternative required standardization of the SBI provided by the Redirect Server as a producer, with a set of operations that will be used by either Sender or Receiver (depending on the variant), to create the mapping table. This SBI may be as follows, with a proposed new service named ResourceMapping, with following operations:

NredirectServer_ResourceMapping_Create: it receives as input a mapping as indicated above:
apiRoot_Old}/{apiName}/{apiVersion}/{apiSpecificResourceUriPart_Old} to {apiRoot_New}/{apiName}/{apiVersion}/{apiSpecificResourceUriPart_New}
NredirectServer_ResourceMapping_Update: it updates a mapping that already existed
NredirectServer_ResourceMapping_Delete: it deletes a mapping
NredirectServer_ResourceMapping_Subscribe: another consumer can subscribe to be notified against changes of a certain Resource mapping
NredirectServer_ResourceMapping_Notify: notification corresponding to the above subscription.

Step 13 At this point NF-X Set 1 may be decommissioned

Step 14: For any Consumer of NF-X Service A that will resolve the IP address for the Old resource URI, the reachability of the Redirect Server will be given. Note that for those Consumers that have locally cached the DNS resolution, this step could be preceded by an unsuccessful request towards NF-X Set 1.

Step 15: The NF-X Service A Consumer requests a Service A operation that is sent to the Redirect Server Step 16: The Redirect Server looks up its mapping table to find the New resource URI corresponding to the Old resource URI.

Step 17: The Redirect Server sends a HTTP 301-redirect message pointing to the New resource URI. This will result in the Consumer updating its local binding for this resource Step 18: The NF-X Service A Consumer requests a Service A operation that is now sent to an address resolved from the New resource URI. This address in the figure identifies a SPoA (Single Point of Access) of NF-X Set 2 but as an alternative it could be the address of one instance of Service A in Set 2.

Steps 19-23: Similar to Steps 2-6

Note that the example shows context transfer between the NF sets, and decommissioning of an NF set. However, embodiments may be equally applicable also is there is only one individual NF instance in the Set. Besides, the embodiments can be applied also in future scenarios where there are individual services or services sets, not belonging to any NFs (in the case of decommissioning such constructs).

The separation of service logic and data facilitates applying cloud-native design principles for services in the SBA domain.

Figure 9:
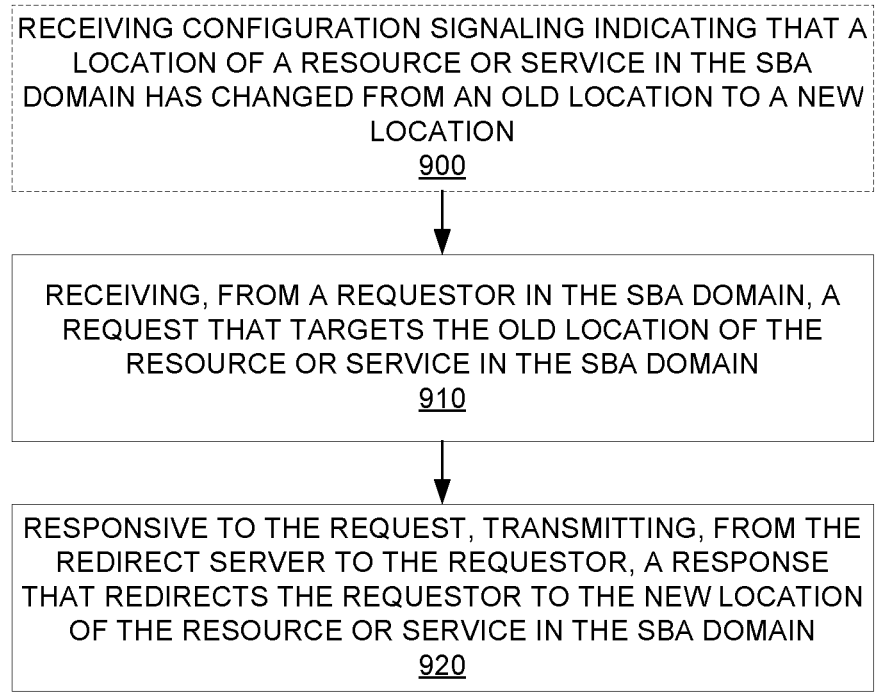
FIG. 9 is a logic flow diagram of a method performed by a redirect server according to some embodiments.

In view of the above modifications and variations, FIG. 9 depicts a method performed by a redirect server 22 in a service-based architecture, SBA, domain 10-SBA of a wireless communication network 10 in accordance with particular embodiments. The method in some embodiments includes receiving configuration signaling 36 indicating that a location of a resource or service 16 in the SBA domain 10-SBA has changed from an old location 20-1 to a new location 20-2 (optional Block 900). The method in one or more embodiments may include receiving, from a requestor 20 in the SBA domain 10-SBA, a request 26 that targets the old location 20-1 of the resource or service 16 in the SBA domain 10-SBA (Block 910). The method may then include, responsive to the request 26, transmitting, from the redirect server 22 to the requestor 20, a response 28 that redirects the requestor 20 to the new location 20-2 of the resource or service 16 in the SBA domain 10-SBA (Block 920).

Figure 10:
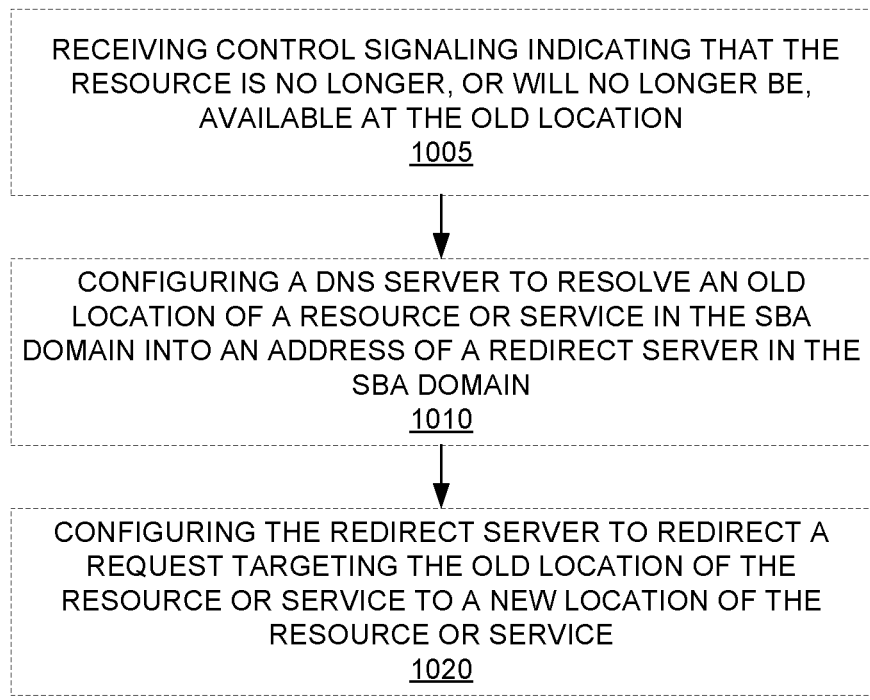
FIG. 10 is a logic flow diagram of a method performed by a reachability controller according to some embodiments.

FIG. 10 depicts a method performed by a reachability controller 34 in a service-based architecture, SBA, domain 10-SBA of a wireless communication network 10 in accordance with other particular embodiments. The method in some embodiments includes configuring a DNS server 38 to resolve an old location 20-1 of a resource or service 16 in the SBA domain 10-SBA into an address of a redirect server 22 in the SBA domain 10-SBA (optional Block 1010). The method in some embodiments alternatively or additionally includes configuring the redirect server 22 to redirect a request targeting the old location 20-1 of the resource or service 16 to a new location 20-2 of the resource or service 16 (optional Block 1020). In some embodiments, this configuring (in Block 1010 and/or 1020) may be performed responsive to receiving control signaling indicating that the resource or service 16 is no longer, or will no longer be, available at the old location 20-1 (Block 1005).

Figure 11:
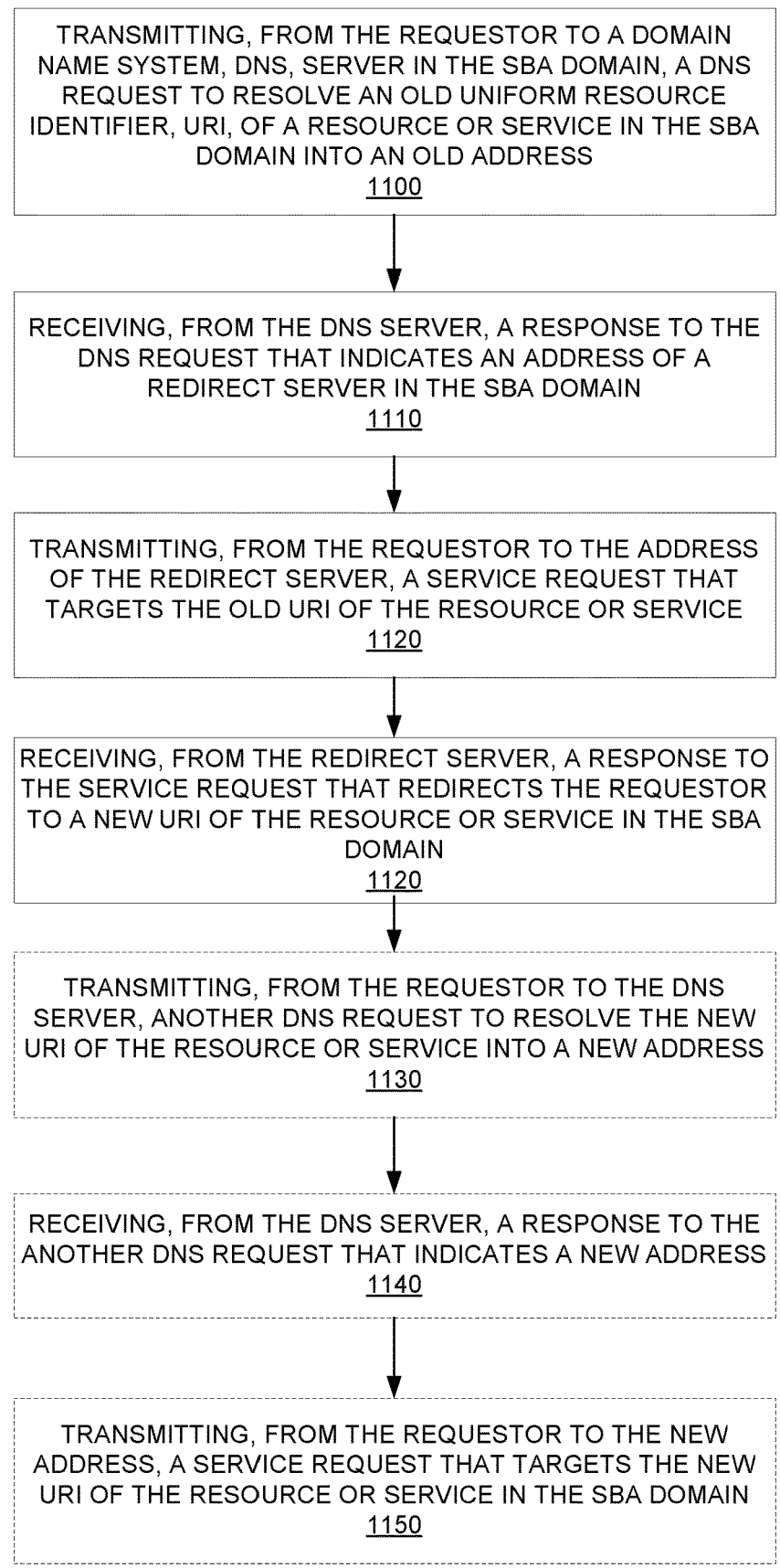
FIG. 11 is a logic flow diagram of a method performed by a requestor according to some embodiments.

FIG. 11 depicts a method performed by a requestor 20 in a service-based architecture, SBA, domain 10-SBA of a wireless communication network 10 in accordance with other particular embodiments. The method in some embodiments includes transmitting, from the requestor 20 to a domain name system, DNS, server 38 in the SBA domain 10-SBA, a DNS request 40 to resolve an old location (e.g., old Uniform Resource Identifier, URI) 20-1 of a resource or service 16 in the SBA domain 10-SBA (Block 1100). The method further includes receiving, from the DNS server 38, a response 42 to the DNS request 40 that indicates an address of a redirect server 22 in the SBA domain 10-SBA (Block 1110). The method also includes transmitting, from the requestor 20 to the address of the redirect server 22, a service request 44 that targets the old location 20-1 of the resource or service 16 (Block 1120). The method then includes receiving, from the redirect server 22, a response 46 to the service request 44 that redirects the requestor 20 to a new location 20-2 of the resource or service 16 in the SBA domain 10-SBA (Block 1130).

In some embodiments, the method may also include transmitting, from the requestor 22 to the DNS server 38, another DNS request 48 to resolve the new location 20-2 of the resource or service 16 (Block 1140). The method may then include receiving, from the DNS server 38, a response 50 to the another DNS request 48 that indicates a new address (Block 1150). The method may also include transmitting, from the requestor 20 to the new address, a service request 52 that targets the new location 20-2 of the resource or service 16 in the SBA domain 10-SBA (Block 1160).

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 12:
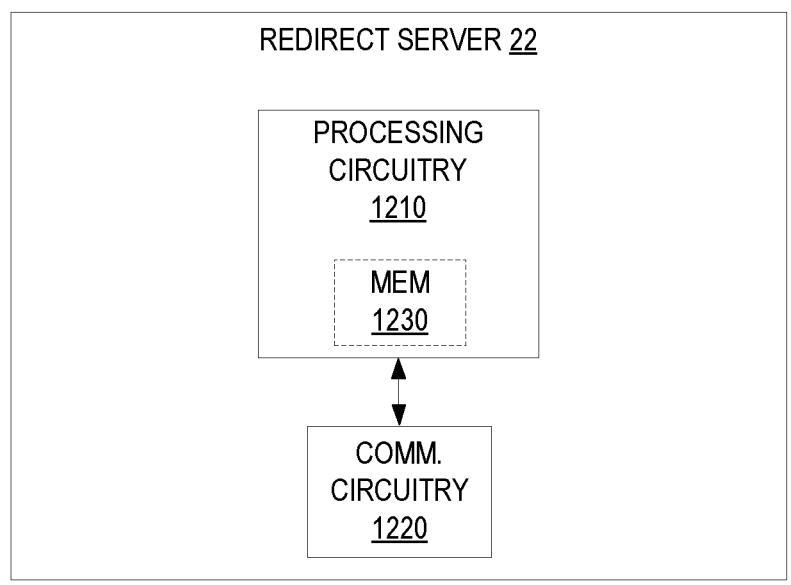
FIG. 12 is a block diagram of a redirect server according to some embodiments.

FIG. 12 for example illustrates the redirect server 22 as implemented in accordance with one or more embodiments. As shown, the redirect server 22 includes processing circuitry 1210 and communication circuitry 1220. The communication circuitry 1220 is configured to transmit and/or receive information to and/or from one or more other nodes, e.g., via any communication technology. The processing circuitry 1210 is configured to perform processing described above, e.g., in FIG. 9, such as by executing instructions stored in memory 1230. The processing circuitry 1210 in this regard may implement certain functional means, units, or modules.

Figure 13:
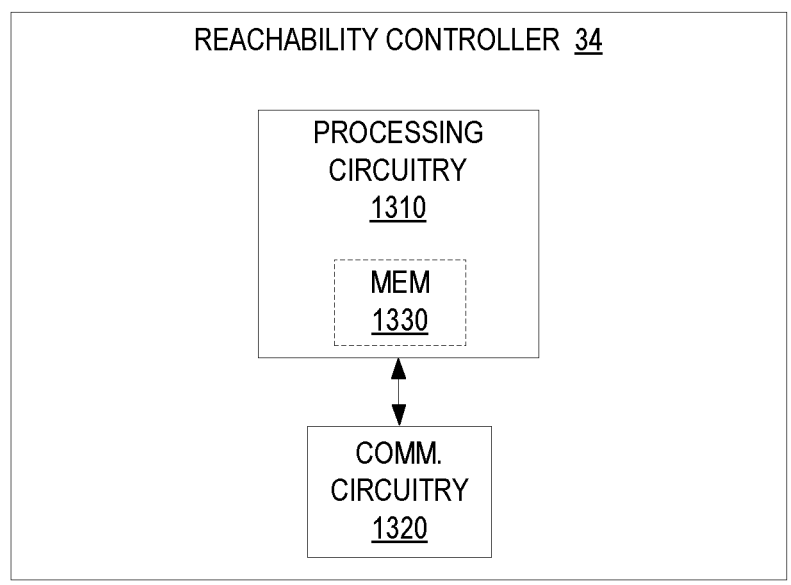
FIG. 13 is a block diagram of a reachability controller according to some embodiments.

FIG. 13 illustrates the reachability controller 34 as implemented in accordance with one or more embodiments. As shown, the reachability controller 34 includes processing circuitry 1310 and communication circuitry 1320. The communication circuitry 1320 is configured to transmit and/or receive information to and/or from one or more other nodes, e.g., via any communication technology. The processing circuitry 1310 is configured to perform processing described above, e.g., in FIG. 10, such as by executing instructions stored in memory 1330. The processing circuitry 1310 in this regard may implement certain functional means, units, or modules.

Figure 14:
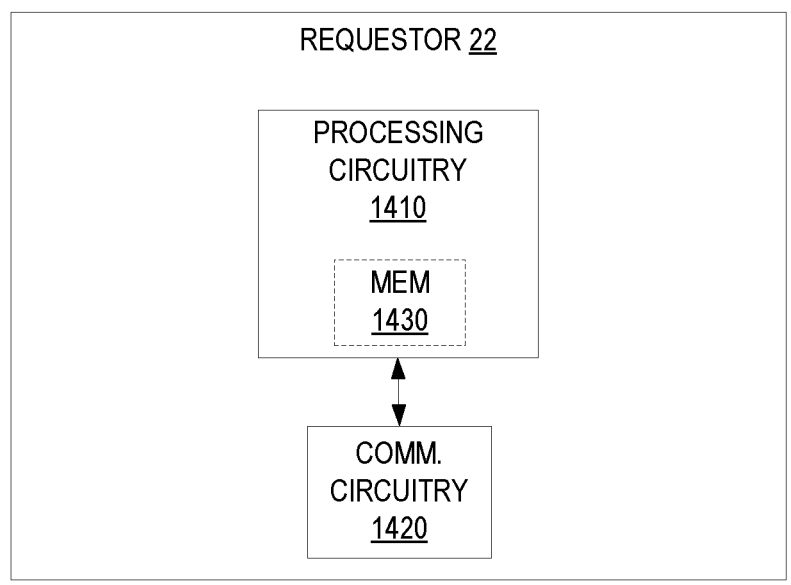
FIG. 14 is a block diagram of a requestor according to some embodiments.

FIG. 14 illustrates the requestor 20 as implemented in accordance with one or more embodiments. As shown, the requestor 20 includes processing circuitry 1410 and communication circuitry 1420. The communication circuitry 1420 is configured to transmit and/or receive information to and/or from one or more other nodes, e.g., via any communication technology. The processing circuitry 1410 is configured to perform processing described above, e.g., in FIG. 11, such as by executing instructions stored in memory 1430. The processing circuitry 1410 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 15:
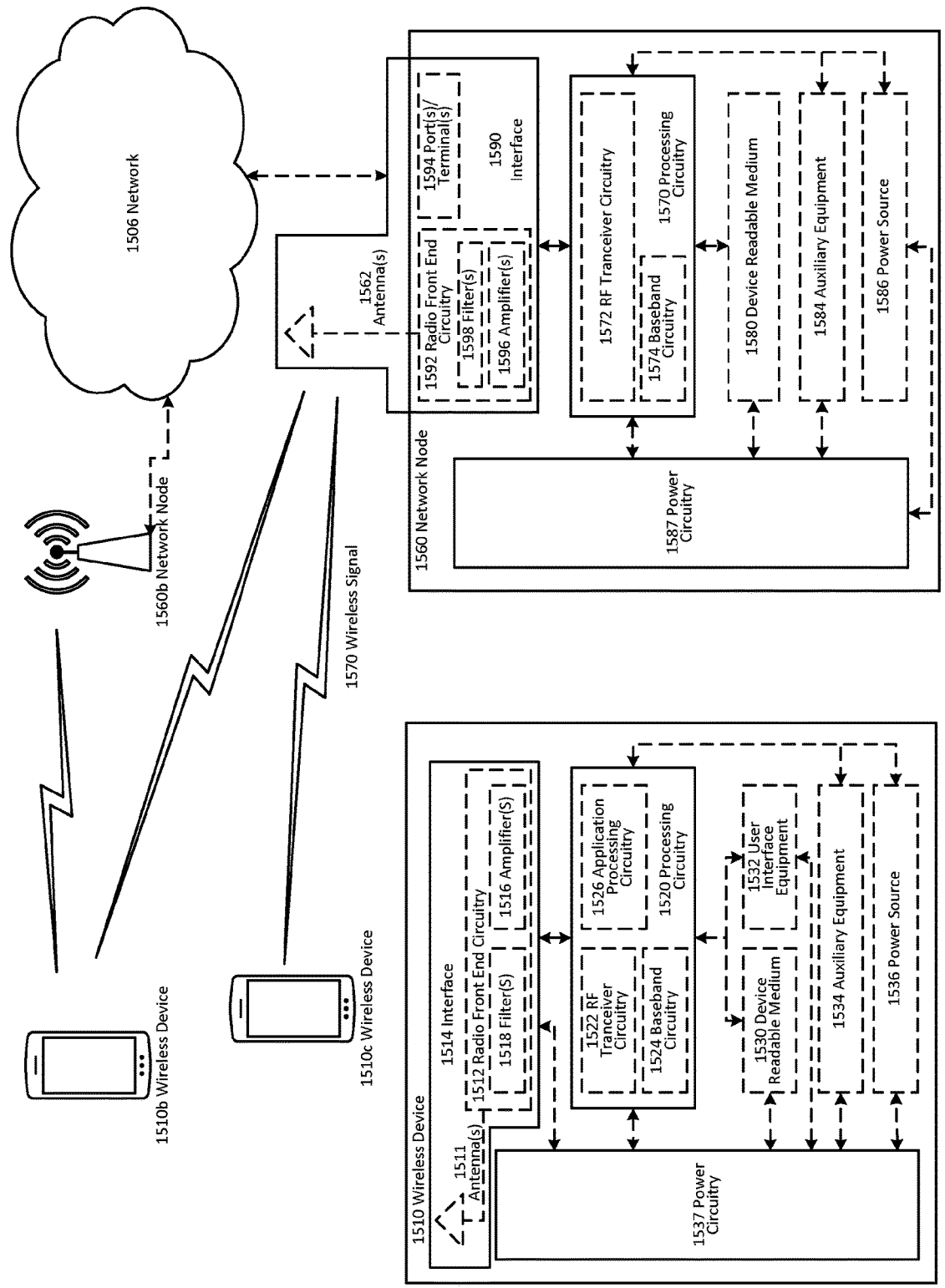
FIG. 15 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 1506, network nodes 1560 and 1560b, and WDs 1510, 1510b, and 1510c. In practice, a wireless network may further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1560 are depicted as single boxes located within a larger box, or nested within multiple boxes, in practice, a network node may comprise multiple different physical components that make up a single illustrated component (e.g., device readable medium 1580 may comprise multiple separate hard drives as well as multiple RAM modules).

Similarly, network node 1560 may be composed of multiple physically separate components (e.g., a NodeB component and a RNC component, or a BTS component and a BSC component, etc.), which may each have their own respective components. In certain scenarios in which network node 1560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1560 may be configured to support multiple radio access technologies (RATs). In such embodiments, some components may be duplicated (e.g., separate device readable medium 1580 for the different RATs) and some components may be reused (e.g., the same antenna 1562 may be shared by the RATs). Network node 1560 may also include multiple sets of the various illustrated components for different wireless technologies integrated into network node 1560, such as, for example, GSM, WCDMA, LTE, NR, WiFi, or Bluetooth wireless technologies. These wireless technologies may be integrated into the same or different chip or set of chips and other components within network node 1560.

Processing circuitry 1570 is configured to perform any determining, calculating, or similar operations (e.g., certain obtaining operations) described herein as being provided by a network node. These operations performed by processing circuitry 1570 may include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1560 components, such as device readable medium 1580, network node 1560 functionality. For example, processing circuitry 1570 may execute instructions stored in device readable medium 1580 or in memory within processing circuitry 1570. Such functionality may include providing any of the various wireless features, functions, or benefits discussed herein. In some embodiments, processing circuitry 1570 may include a system on a chip (SOC).

In some embodiments, processing circuitry 1570 may include one or more of radio frequency (RF) transceiver circuitry 1572 and baseband processing circuitry 1574. In some embodiments, radio frequency (RF) transceiver circuitry 1572 and baseband processing circuitry 1574 may be on separate chips (or sets of chips), boards, or units, such as radio units and digital units. In alternative embodiments, part or all of RF transceiver circuitry 1572 and baseband processing circuitry 1574 may be on the same chip or set of chips, boards, or units In certain embodiments, some or all of the functionality described herein as being provided by a network node, base station, eNB or other such network device may be performed by processing circuitry 1570 executing instructions stored on device readable medium 1580 or memory within processing circuitry 1570. In alternative embodiments, some or all of the functionality may be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560, but are enjoyed by network node 1560 as a whole, and/or by end users and the wireless network generally.

Device readable medium 1580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1570. Device readable medium 1580 may store any suitable instructions, data or information, including a computer program, software, an application including one or more of logic, rules, code, tables, etc. and/or other instructions capable of being executed by processing circuitry 1570 and, utilized by network node 1560. Device readable medium 1580 may be used to store any calculations made by processing circuitry 1570 and/or any data received via interface 1590. In some embodiments, processing circuitry 1570 and device readable medium 1580 may be considered to be integrated.

Interface 1590 is used in the wired or wireless communication of signalling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that may be coupled to, or in certain embodiments a part of, antenna 1562. Radio front end circuitry 1592 comprises filters 1598 and amplifiers 1596. Radio front end circuitry 1592 may be connected to antenna 1562 and processing circuitry 1570. Radio front end circuitry may be configured to condition signals communicated between antenna 1562 and processing circuitry 1570. Radio front end circuitry 1592 may receive digital data that is to be sent out to other network nodes or WDs via a wireless connection. Radio front end circuitry 1592 may convert the digital data into a radio signal having the appropriate channel and bandwidth parameters using a combination of filters 1598 and/or amplifiers 1596. The radio signal may then be transmitted via antenna 1562. Similarly, when receiving data, antenna 1562 may collect radio signals which are then converted into digital data by radio front end circuitry 1592. The digital data may be passed to processing circuitry 1570. In other embodiments, the interface may comprise different components and/or different combinations of components.

In certain alternative embodiments, network node 1560 may not include separate radio front end circuitry 1592, instead, processing circuitry 1570 may comprise radio front end circuitry and may be connected to antenna 1562 without separate radio front end circuitry 1592. Similarly, in some embodiments, all or some of RF transceiver circuitry 1572 may be considered a part of interface 1590. In still other embodiments, interface 1590 may include one or more ports or terminals 1594, radio front end circuitry 1592, and RF transceiver circuitry 1572, as part of a radio unit (not shown), and interface 1590 may communicate with baseband processing circuitry 1574, which is part of a digital unit (not shown).

Antenna 1562 may include one or more antennas, or antenna arrays, configured to send and/or receive wireless signals. Antenna 1562 may be coupled to radio front end circuitry 1590 and may be any type of antenna capable of transmitting and receiving data and/or signals wirelessly. In some embodiments, antenna 1562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1562 may be separate from network node 1560 and may be connectable to network node 1560 through an interface or port.

Antenna 1562, interface 1590, and/or processing circuitry 1570 may be configured to perform any receiving operations and/or certain obtaining operations described herein as being performed by a network node. Any information, data and/or signals may be received from a wireless device, another network node and/or any other network equipment. Similarly, antenna 1562, interface 1590, and/or processing circuitry 1570 may be configured to perform any transmitting operations described herein as being performed by a network node. Any information, data and/or signals may be transmitted to a wireless device, another network node and/or any other network equipment.

Power circuitry 1587 may comprise, or be coupled to, power management circuitry and is configured to supply the components of network node 1560 with power for performing the functionality described herein. Power circuitry 1587 may receive power from power source 1586. Power source 1586 and/or power circuitry 1587 may be configured to provide power to the various components of network node 1560 in a form suitable for the respective components (e.g., at a voltage and current level needed for each respective component). Power source 1586 may either be included in, or external to, power circuitry 1587 and/or network node 1560. For example, network node 1560 may be connectable to an external power source (e.g., an electricity outlet) via an input circuitry or interface such as an electrical cable, whereby the external power source supplies power to power circuitry 1587. As a further example, power source 1586 may comprise a source of power in the form of a battery or battery pack which is connected to, or integrated in, power circuitry 1587. The battery may provide backup power should the external power source fail. Other types of power sources, such as photovoltaic devices, may also be used.

Alternative embodiments of network node 1560 may include additional components beyond those shown in FIG. 15 that may be responsible for providing certain aspects of the network node's functionality, including any of the functionality described herein and/or any functionality necessary to support the subject matter described herein. For example, network node 1560 may include user interface equipment to allow input of information into network node 1560 and to allow output of information from network node 1560. This may allow a user to perform diagnostic, maintenance, repair, and other administrative functions for network node 1560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (Vol P) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (N B-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 may include multiple sets of one or more of the illustrated components for different wireless technologies supported by WD 1510, such as, for example, GSM, WCDMA, LTE, NR, WiFi, WiMAX, N B-IoT, or Bluetooth wireless technologies, just to mention a few. These wireless technologies may be integrated into the same or different chips or set of chips as other components within WD 1510.

Antenna 1511 may include one or more antennas or antenna arrays, configured to send and/or receive wireless signals, and is connected to interface 1514. In certain alternative embodiments, antenna 1511 may be separate from WD 1510 and be connectable to WD 1510 through an interface or port. Antenna 1511, interface 1514, and/or processing circuitry 1520 may be configured to perform any receiving or transmitting operations described herein as being performed by a WD. Any information, data and/or signals may be received from a network node and/or another WD. In some embodiments, radio front end circuitry and/or antenna 1511 may be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520, and is configured to condition signals communicated between antenna 1511 and processing circuitry 1520. Radio front end circuitry 1512 may be coupled to or a part of antenna 1511. In some embodiments, WD 1510 may not include separate radio front end circuitry 1512; rather, processing circuitry 1520 may comprise radio front end circuitry and may be connected to antenna 1511. Similarly, in some embodiments, some or all of RF transceiver circuitry 1522 may be considered a part of interface 1514. Radio front end circuitry 1512 may receive digital data that is to be sent out to other network nodes or WDs via a wireless connection. Radio front end circuitry 1512 may convert the digital data into a radio signal having the appropriate channel and bandwidth parameters using a combination of filters 1518 and/or amplifiers 1516. The radio signal may then be transmitted via antenna 1511. Similarly, when receiving data, antenna 1511 may collect radio signals which are then converted into digital data by radio front end circuitry 1512. The digital data may be passed to processing circuitry 1520. In other embodiments, the interface may comprise different components and/or different combinations of components.

Processing circuitry 1520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1510 components, such as device readable medium 1530, WD 1510 functionality. Such functionality may include providing any of the various wireless features or benefits discussed herein. For example, processing circuitry 1520 may execute instructions stored in device readable medium 1530 or in memory within processing circuitry 1520 to provide the functionality disclosed herein.

As illustrated, processing circuitry 1520 includes one or more of RF transceiver circuitry 1522, baseband processing circuitry 1524, and application processing circuitry 1526. In other embodiments, the processing circuitry may comprise different components and/or different combinations of components. In certain embodiments processing circuitry 1520 of WD 1510 may comprise a SOC. In some embodiments, RF transceiver circuitry 1522, baseband processing circuitry 1524, and application processing circuitry 1526 may be on separate chips or sets of chips. In alternative embodiments, part or all of baseband processing circuitry 1524 and application processing circuitry 1526 may be combined into one chip or set of chips, and RF transceiver circuitry 1522 may be on a separate chip or set of chips. In still alternative embodiments, part or all of RF transceiver circuitry 1522 and baseband processing circuitry 1524 may be on the same chip or set of chips, and application processing circuitry 1526 may be on a separate chip or set of chips. In yet other alternative embodiments, part or all of RF transceiver circuitry 1522, baseband processing circuitry 1524, and application processing circuitry 1526 may be combined in the same chip or set of chips. In some embodiments, RF transceiver circuitry 1522 may be a part of interface 1514. RF transceiver circuitry 1522 may condition RF signals for processing circuitry 1520.

In certain embodiments, some or all of the functionality described herein as being performed by a WD may be provided by processing circuitry 1520 executing instructions stored on device readable medium 1530, which in certain embodiments may be a computer-readable storage medium. In alternative embodiments, some or all of the functionality may be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 may be configured to perform any determining, calculating, or similar operations (e.g., certain obtaining operations) described herein as being performed by a WD. These operations, as performed by processing circuitry 1520, may include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 may be operable to store a computer program, software, an application including one or more of logic, rules, code, tables, etc. and/or other instructions capable of being executed by processing circuitry 1520. Device readable medium 1530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1520. In some embodiments, processing circuitry 1520 and device readable medium 1530 may be considered to be integrated.

User interface equipment 1532 may provide components that allow for a human user to interact with WD 1510. Such interaction may be of many forms, such as visual, audial, tactile, etc. User interface equipment 1532 may be operable to produce output to the user and to allow the user to provide input to WD 1510. The type of interaction may vary depending on the type of user interface equipment 1532 installed in WD 1510. For example, if WD 1510 is a smart phone, the interaction may be via a touch screen; if WD 1510 is a smart meter, the interaction may be through a screen that provides usage (e.g., the number of gallons used) or a speaker that provides an audible alert (e.g., if smoke is detected). User interface equipment 1532 may include input interfaces, devices and circuits, and output interfaces, devices and circuits. User interface equipment 1532 is configured to allow input of information into WD 1510, and is connected to processing circuitry 1520 to allow processing circuitry 1520 to process the input information. User interface equipment 1532 may include, for example, a microphone, a proximity or other sensor, keys/buttons, a touch display, one or more cameras, a USB port, or other input circuitry. User interface equipment 1532 is also configured to allow output of information from WD 1510, and to allow processing circuitry 1520 to output information from WD 1510. User interface equipment 1532 may include, for example, a speaker, a display, vibrating circuitry, a USB port, a headphone interface, or other output circuitry. Using one or more input and output interfaces, devices, and circuits, of user interface equipment 1532, WD 1510 may communicate with end users and/or the wireless network, and allow them to benefit from the functionality described herein.

Auxiliary equipment 1534 is operable to provide more specific functionality which may not be generally performed by WDs. This may comprise specialized sensors for doing measurements for various purposes, interfaces for additional types of communication such as wired communications etc. The inclusion and type of components of auxiliary equipment 1534 may vary depending on the embodiment and/or scenario.

Power source 1536 may, in some embodiments, be in the form of a battery or battery pack. Other types of power sources, such as an external power source (e.g., an electricity outlet), photovoltaic devices or power cells, may also be used. WD 1510 may further comprise power circuitry 1537 for delivering power from power source 1536 to the various parts of WD 1510 which need power from power source 1536 to carry out any functionality described or indicated herein. Power circuitry 1537 may in certain embodiments comprise power management circuitry. Power circuitry 1537 may additionally or alternatively be operable to receive power from an external power source; in which case WD 1510 may be connectable to the external power source (such as an electricity outlet) via input circuitry or an interface such as an electrical power cable. Power circuitry 1537 may also in certain embodiments be operable to deliver power from an external power source to power source 1536. This may be, for example, for the charging of power source 1536. Power circuitry 1537 may perform any formatting, converting, or other modification to the power from power source 1536 to make the power suitable for the respective components of WD 1510 to which power is supplied.

Figure 16:
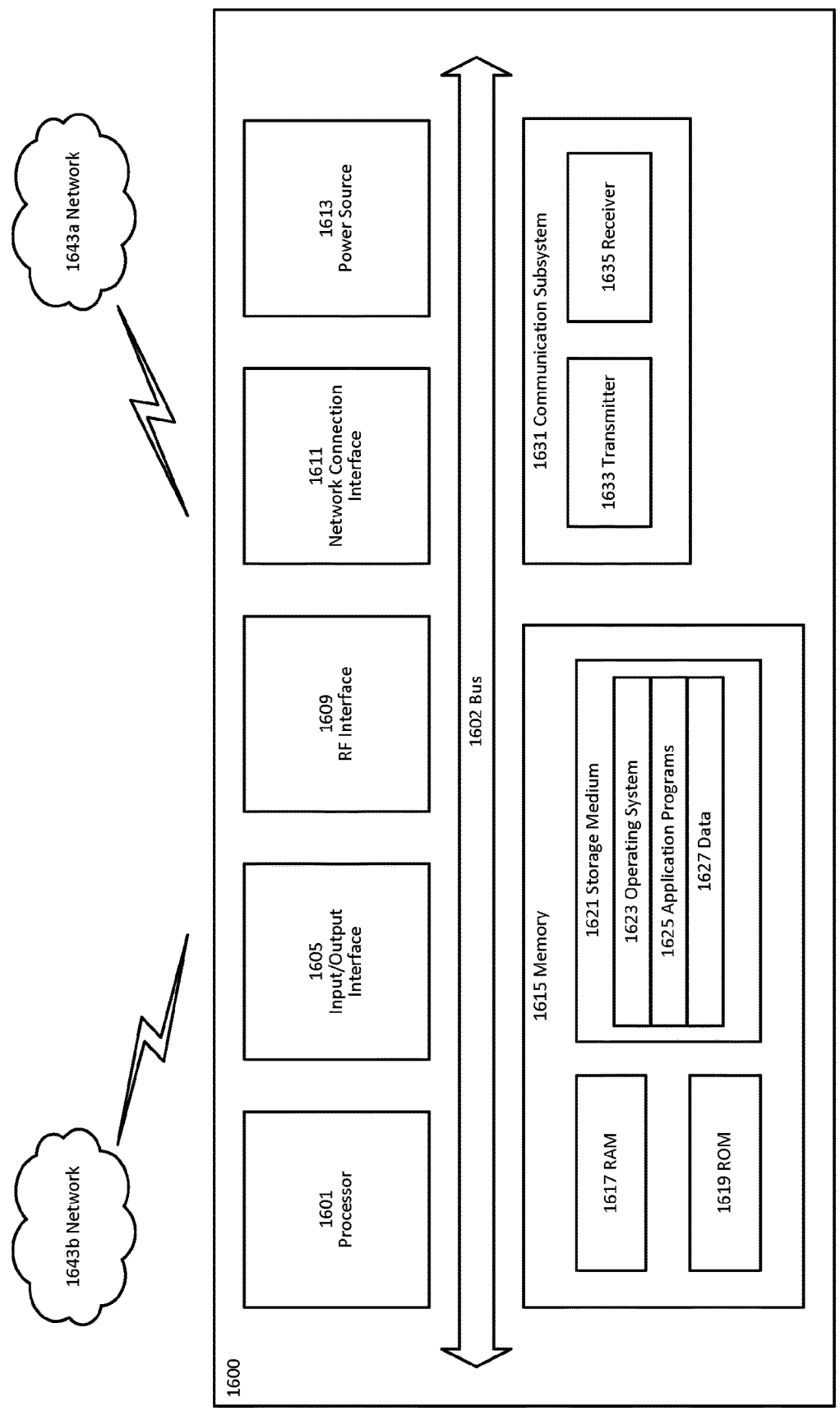
FIG. 16 is a block diagram of a wireless device according to some embodiments.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 16200 may be any UE identified by the $3^{rd}$ Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1601 may be configured to process computer instructions and data. Processing circuitry 1601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 may include two central processing units (CPUs). Data may be information in a form suitable for use by a computer.

In the depicted embodiment, input/output interface 1605 may be configured to provide a communication interface to an input device, output device, or input and output device. UE 1600 may be configured to use an output device via input/output interface 1605. An output device may use the same type of interface port as an input device. For example, a USB port may be used to provide input to and output from UE 1600. The output device may be a speaker, a sound card, a video card, a display, a monitor, a printer, an actuator, an emitter, a smartcard, another output device, or any combination thereof. UE 1600 may be configured to use an input device via input/output interface 1605 to allow a user to capture information into UE 1600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1609 may be configured to provide a communication interface to RF components such as a transmitter, a receiver, and an antenna. Network connection interface 1611 may be configured to provide a communication interface to network 1643*a*. Network 1643*a* may encompass wired and/or wireless networks such as a local-area network (LAN), a wide-area network (WAN), a computer network, a wireless network, a telecommunications network, another like network or any combination thereof. For example, network 1643*a* may comprise a Wi-Fi network. Network connection interface 1611 may be configured to include a receiver and a transmitter interface used to communicate with one or more other devices over a communication network according to one or more communication protocols, such as Ethernet, TCP/IP, SONET, ATM, or the like. Network connection interface 1611 may implement receiver and transmitter functionality appropriate to the communication network links (e.g., optical, electrical, and the like). The transmitter and receiver functions may share circuit components, software or firmware, or alternatively may be implemented separately.

RAM 1617 may be configured to interface via bus 1602 to processing circuitry 1601 to provide storage or caching of data or computer instructions during the execution of software programs such as the operating system, application programs, and device drivers. ROM 1619 may be configured to provide computer instructions or data to processing circuitry 1601. For example, ROM 1619 may be configured to store invariant low-level system code or data for basic system functions such as basic input and output (I/O), startup, or reception of keystrokes from a keyboard that are stored in a non-volatile memory. Storage medium 1621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1621 may be configured to include operating system 1623, application program 1625 such as a web browser application, a widget or gadget engine or another application, and data file 1627. Storage medium 1621 may store, for use by UE 1600, any of a variety of various operating systems or combinations of operating systems.

Storage medium 1621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 may allow UE 1600 to access computer-executable instructions, application programs or the like, stored on transitory or non-transitory memory media, to off-load data, or to upload data. An article of manufacture, such as one utilizing a communication system may be tangibly embodied in storage medium 1621, which may comprise a device readable medium.

In FIG. 16, processing circuitry 1601 may be configured to communicate with network 1643*b* using communication subsystem 1631. Network 1643*a* and network 1643*b* may be the same network or networks or different network or networks. Communication subsystem 1631 may be configured to include one or more transceivers used to communicate with network 1643*b*. For example, communication subsystem 1631 may be configured to include one or more transceivers used to communicate with one or more remote transceivers of another device capable of wireless communication such as another WD, UE, or base station of a radio access network (RAN) according to one or more communication protocols, such as IEEE 802.16, CDMA, WCDMA, GSM, LTE, UTRAN, WiMax, or the like. Each transceiver may include transmitter 1633 and/or receiver 1635 to implement transmitter or receiver functionality, respectively, appropriate to the RAN links (e.g., frequency allocations and the like). Further, transmitter 1633 and receiver 1635 of each transceiver may share circuit components, software or firmware, or alternatively may be implemented separately.

In the illustrated embodiment, the communication functions of communication subsystem 1631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 may include cellular communication, Wi-Fi communication, Bluetooth communication, and GPS communication. Network 1643*b* may encompass wired and/or wireless networks such as a local-area network (LAN), a wide-area network (WAN), a computer network, a wireless network, a telecommunications network, another like network or any combination thereof. For example, network 1643*b* may be a cellular network, a Wi-Fi network, and/or a near-field network. Power source 1613 may be configured to provide alternating current (AC) or direct current (DC) power to components of UE 1600.

The features, benefits and/or functions described herein may be implemented in one of the components of UE 1600 or partitioned across multiple components of UE 1600. Further, the features, benefits, and/or functions described herein may be implemented in any combination of hardware, software or firmware. In one example, communication subsystem 1631 may be configured to include any of the components described herein. Further, processing circuitry 1601 may be configured to communicate with any of such components over bus 1602. In another example, any of such components may be represented by program instructions stored in memory that when executed by processing circuitry 1601 perform the corresponding functions described herein. In another example, the functionality of any of such components may be partitioned between processing circuitry 1601 and communication subsystem 1631. In another example, the non-computationally intensive functions of any of such components may be implemented in software or firmware and the computationally intensive functions may be implemented in hardware.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. For the avoidance of doubt, the scope of the invention is defined by the claims.

The following numbered statements provide additional information on certain aspects of embodiments:

1. A method performed by a redirect server in a service-based architecture, SBA, domain of a wireless communication network, the method comprising:
   receiving configuration signaling indicating that a location of a resource or service in the SBA domain has changed from an old location to a new location;
   receiving, from a requestor in the SBA domain, a request that targets the old location of the resource or service in the SBA domain;
   responsive to the request, transmitting, from the redirect server to the requestor, a response that redirects the requestor to the new location of the resource or service in the SBA domain.

2. The method of embodiment 1, wherein the configuration signaling is received from an old manager that managed the resource or service at the old location and/or from a new manager that manages the resource or service at the new location.

3. The method any of embodiments 1 and 2, wherein the configuration signaling is received from a network node or function responsible for operation and maintenance in the wireless communication network.

4. The method of any of embodiments 1 to 3, further comprising:
   storing, in a mapping table at the redirect server, a mapping from the old location to the new location; and
   responsive to receiving the request, determining from the mapping table the new location from which the old location maps.

5. The method of any of embodiments 1 to 4, wherein the request is a HyperText Transfer Protocol, HTTP, request, and wherein the response is an HTTP 301 Redirect message.

6. The method of any of embodiments 1 to 5, wherein the old location is indicated by an old Uniform Resource Identifier, URI, of the resource, and wherein the new location is indicated by a new URI of the resource.

7. The method of any of embodiments 1 to 6, wherein the resource is a resource of a context for a wireless device or session in the wireless communication network.

8. The method of any of embodiments 1 to 7, wherein the redirect server is distinct from an old manager that managed the resource or service at the old location.

9. The method of any of embodiments 1 to 8, wherein the resource or service is managed by an authentication server function, a network exposure function, a network repository function, a network slice selection function, a policy control function, a unified data management function, a user plane function, an application function, a network data analytics function, or a charging function.

10. A method performed by a reachability controller in a service-based architecture, SBA, domain of a wireless communication network, the method comprising:
    configuring a DNS server to resolve an old location of a resource or service in the SBA domain into an address of a redirect server in the SBA domain; and
    configuring the redirect server to redirect a request targeting the old location of the resource or service to a new location of the resource or service.

11. The method of embodiment 10, wherein the old location is an old Uniform Resource Identifier, URI, of the resource or service, and wherein the new location is a new URI of the resource or service.

12. The method of any of embodiments 10 and 11, wherein the reachability controller is implemented by a network node or function responsible for operation and maintenance in the wireless communication network.

13. The method of any of embodiments 10 and 11, wherein the reachability controller is implemented by an old manager that managed the resource or service at the old location or a new manager that manages the resource or service at the new location.

14. The method of any of embodiments 10 to 13, further comprising receiving control signaling indicating that the resource or service is no longer, or will no longer be, available at the old location, and wherein said configuring of the DNS server and the redirect server is performed responsive to receipt of the control signaling.

15. The method of embodiment 14, wherein the control signaling indicates that an old manager that managed the resource or service at the old location is to be decommissioned.

16. The method of any of embodiments 14 and 15, wherein the control signaling is received from a network repository function, NRF, in the SBA domain.

17. The method of any of embodiments 14 and 15, wherein the control signaling is received from an old manager that managed the resource or service at the old location or from a new manager that manages the resource or service at the new location.

18. The method of any of embodiments 10 to 17, further comprising:
    receiving, from an old manager that managed the resource or service at the old location, information indicating one or more key values associated with the resource or service and indicating the old location of the resource or service;

receiving, from a new manager that manages the resource or service at the new location, information indicating one or more key values associated with the resource or service and indicating the new location of the resource or service; and determining a mapping of the old location to the new location based on the information received from the old manager and the new manager.

19. The method of any of embodiments 10 to 18, wherein the resource is a resource of a context for a wireless device or session in the wireless communication network.

20. The method of any of embodiments 10 to 19, wherein the redirect server is distinct from an old manager that managed the resource or service at the old location.

21. The method of any of embodiments 10 to 20, wherein the resource or service is managed by an authentication server function, a network exposure function, a network repository function, a network slice selection function, a policy control function, a unified data management function, a user plane function, an application function, a network data analytics function, or a charging function.

22. A method performed by a requestor in a service-based architecture, SBA, domain of a wireless communication network, the method comprising:

transmitting, from the requestor to a domain name system, DNS, server in the SBA domain, a DNS request to resolve an old Uniform Resource Identifier, URI, of a resource or service in the SBA domain;

receiving, from the DNS server, a response to the DNS request that indicates an address of a redirect server in the SBA domain;

transmitting, from the requestor to the address of the redirect server, a service request that targets the old URI of the resource or service; and receiving, from the redirect server, a response to the service request that redirects the requestor to a new URI of the resource or service in the SBA domain.

23. The method of embodiment 22, further comprising:

transmitting, from the requestor to the DNS server, another DNS request to resolve the new URI of the resource or service;

receiving, from the DNS server, a response to the another DNS request that indicates a new address; and transmitting, from the requestor to the new address, a service request that targets the new URI of the resource or service in the SBA domain.

24. The method of any of embodiments 22 and 23, wherein the response received from the redirect server is a HyperText Transfer Protocol, HTTP, 301 Redirect Message.

25. The method of any of embodiments 22 to 24, wherein the resource is a resource of a context for a wireless device or session in the wireless communication network.

26. The method of any of embodiments 22 to 25, wherein the redirect server is distinct from an old manager that managed the resource or service at the old URI.

27. The method of any of embodiments 22 to 26, wherein the resource or service is managed by an authentication server function, a network exposure function, a network repository function, a network slice selection function, a policy control function, a unified data management function, a user plane function, an application function, a network data analytics function, or a charging function.

28. A redirect server configured for use in a service-based architecture, SBA, domain of a wireless communication network, the redirect server configured to perform any of the steps of any of embodiments 1 to 9.

29. A redirect server configured for use in a service-based architecture, SBA, domain of a wireless communication network, the redirect server comprising:
communication circuitry; and
processing circuitry configured to perform any of the steps of any of embodiments 1 to 9;

30. A redirect server configured for use in a service-based architecture, SBA, domain of a wireless communication network, the redirect server comprising:
processing circuitry configured to perform any of the steps of any of embodiments 1 to 9;
power supply circuitry configured to supply power to the redirect server.

31. A redirect server configured for use in a service-based architecture, SBA, domain of a wireless communication network, the redirect server comprising:
processing circuitry and memory, the memory containing instructions executable by the processing circuitry whereby the redirect server is configured to perform any of the steps of any of embodiments 1 to 9.

32. A computer program comprising instructions which, when executed by at least one processor of a redirect server, causes the redirect server to carry out the steps of any of embodiments 1 to 9.

33. A carrier containing the computer program of embodiment 32, wherein the carrier is one of an electronic signal, optical signal, radio signal, or computer readable storage medium.

34. A reachability controller configured for use in a service-based architecture, SBA, domain of a wireless communication network, the reachability controller configured to perform any of the steps of any of embodiments 10 to 21.

35. A reachability controller configured for use in a service-based architecture, SBA, domain of a wireless communication network, the reachability controller comprising:
communication circuitry; and
processing circuitry configured to perform any of the steps of any of embodiments 10 to 21;

36. A reachability controller configured for use in a service-based architecture, SBA, domain of a wireless communication network, the reachability controller comprising:
processing circuitry configured to perform any of the steps of any of embodiments 10 to 21;
power supply circuitry configured to supply power to the reachability controller.

37. A reachability controller configured for use in a service-based architecture, SBA, domain of a wireless communication network, the reachability controller comprising:
processing circuitry and memory, the memory containing instructions executable by the processing circuitry whereby the reachability controller is configured to perform any of the steps of any of embodiments 10 to 21.

38. A computer program comprising instructions which, when executed by at least one processor of a reachability controller, causes the reachability controller to carry out the steps of any of embodiments 10 to 21.

39. A carrier containing the computer program of embodiment 38, wherein the carrier is one of an electronic signal, optical signal, radio signal, or computer readable storage medium.

40. A requestor configured for use in a service-based architecture, SBA, domain of a wireless communication network, the requestor configured to perform any of the steps of any of embodiments 22 to 27.

41. A requestor configured for use in a service-based architecture, SBA, domain of a wireless communication network, the requestor comprising:
  communication circuitry; and
  processing circuitry configured to perform any of the steps of any of embodiments 22 to 27;

42. A requestor configured for use in a service-based architecture, SBA, domain of a wireless communication network, the requestor comprising:
  processing circuitry configured to perform any of the steps of any of embodiments 22 to 27;
  power supply circuitry configured to supply power to the requestor.

43. A requestor configured for use in a service-based architecture, SBA, domain of a wireless communication network, the requestor comprising:
  processing circuitry and memory, the memory containing instructions executable by the processing circuitry whereby the requestor is configured to perform any of the steps of any of embodiments 22 to 27.

44. A computer program comprising instructions which, when executed by at least one processor of a requestor, causes the requestor to carry out the steps of any of embodiments 22 to 27.

45. A carrier containing the computer program of embodiment 44, wherein the carrier is one of an electronic signal, optical signal, radio signal, or computer readable storage medium.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

5GC 5$^{th}$ Generation Core Network
CN Core Network
CNA Cloud Native Architecture
DC Data Center
NF Network Function
NRF Network Repository Function
SBA Service based Architecture
UDSF Unstructure Data Storage Function
UE User Equipment
1× RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A redirect server in a service-based architecture, SBA, domain of a wireless communication network, the redirect server comprising:
communication circuitry and processing circuitry configured to:
receive configuration signaling indicating that a location of one of a resource and service in the SBA domain has been transferred from an old location to a new location, the configuration signalling being received from an old manager that managed the one of the resource and service at the old location and indicating the transferred one of the resource and service is no longer available at the old location, the configuration signaling being received from one of a network node and a function responsible for operation and maintenance in the wireless communication network;
receive, from a requestor in the SBA domain, a request that targets the old location of the transferred one of the resource and service in the SBA domain; and
responsive to the request, transmit, from the redirect server to the requestor, a response that redirects the requestor to the new location of the transferred one of the resource and service in the SBA domain.

2. The redirect server of claim 1, wherein the configuration signaling is received from a new manager that manages the transferred one of the resource and service at the new location.

3. The redirect server of claim 1, wherein the communication circuitry and processing circuitry are further configured to:
store, in a mapping table at the redirect server, a mapping from the old location to the new location; and
responsive to receiving the request, determine from the mapping table the new location from which the old location maps.

4. The redirect server of claim 1, wherein the request is a HyperText Transfer Protocol, HTTP, request, and wherein the response is an HTTP 301 Redirect message.

5. The redirect server of claim 1, wherein the old location is indicated by an old Uniform Resource Identifier, URI, of the resource, and wherein the new location is indicated by a new URI of the resource.

6. The redirect server of claim 1, wherein the resource is a resource of a context for a wireless device or session in the wireless communication network.

7. The redirect server of claim 1, wherein the redirect server is distinct from the old manager that managed the transferred one of the resource and service at the old location.

8. A reachability controller in a service-based architecture, SBA, domain of a wireless communication network, the reachability controller comprising:
communication circuitry and processing circuitry configured to:
receive control signaling indicating that the transferred one of the resource and service is no longer available at an old location, the control signaling being received from an old manager that managed the transferred one of the resource and service at the old location, the control signaling being received from one of a network node and a function responsible for operation and maintenance in the wireless communication network;
configure a Domain Name Service, DNS, server to resolve the old location of a transferred one of a resource and service in the SBA domain into an address of a redirect server in the SBA domain; and
configure the redirect server to redirect a request targeting the old location of the transferred one of the resource and service to a new location of the resource or service.

9. The reachability controller of claim 8, wherein the old location is an old Uniform Resource Identifier, URI, of the transferred one of the resource and service, and wherein the new location is a new URI of the transferred one of the resource and service.

10. The reachability controller of claim 8, wherein the configuring of the DNS server and the redirect server is performed responsive to receipt of the control signaling.

11. The reachability controller of claim 10, wherein the control signaling is received from a new manager that manages the transferred one of the resource and service at the new location.

12. The reachability controller of claim 8, wherein the communication circuitry and processing circuitry are further configured to:
receive, from the old manager that managed the transferred one of the resource and service at the old location, information indicating one or more key values associated with the transferred one of the resource and service and indicating the old location of the transferred one of the resource and service;
receive, from a new manager that manages the transferred one of the resource and service at the new location, information indicating one or more key values associated with the transferred one of the resource and service and indicating the new location of the transferred one of the resource and service; and determine a mapping of the old location to the new location based on the information received from the old manager and the new manager.

13. The reachability controller of claim 8, wherein the resource is a resource of a context for one of a wireless device and session in the wireless communication network.

14. The reachability controller of claim 8, wherein the redirect server is distinct from the old manager that managed the transferred one of the resource and service at the old location.

15. A requestor in a service-based architecture, SBA, domain of a wireless communication network, the requestor comprising:

communication circuitry and processing circuitry configured to:

transmit, from the requestor to a domain name system, DNS, server in the SBA domain, a DNS request to resolve an old Uniform Resource Identifier, URI, of a transferred one of a resource and service in the SBA domain;

receive, from the DNS server, a response to the DNS request that indicates an address of a redirect server in the SBA domain;

transmit, from the requestor to the address of the redirect server, a service request that targets the old URI of the transferred one of the resource and service, the old URI corresponding to an old manager that managed the transferred one of the resource and service at an old location, the transferred one of the resource and service being associated with control signaling transmitted from the old manager to the redirect server indicating the transferred one of the resource and service is no longer available at the old location, the control signaling being transmitted from one of a network node and a function responsible for operation and maintenance in the wireless communication network; and receive, from the redirect server, a response to the service request that redirects the requestor to a new URI of the transferred one of the resource and service in the SBA domain.

16. The requestor of claim 15, wherein the communication circuitry and processing circuitry are further configured to:

transmit, from the requestor to the DNS server, another DNS request to resolve the new URI of the transferred one of the resource and service;

receive, from the DNS server, a response to the another DNS request that indicates a new address; and transmit, from the requestor to the new address, a service request that targets the new URI of the transferred one of the resource and service in the SBA domain.

17. The requestor of claim 15, wherein the response received from the redirect server is a HyperText Transfer Protocol, HTTP, 301 Redirect Message.

18. The requestor of claim 15, wherein the resource is a resource of a context for one of a wireless device and session in the wireless communication network.

19. The requestor of claim 15, wherein the redirect server is distinct from the old manager that managed the transferred one of the resource and service at the old URI.

* * * * *